US007751629B2

(12) United States Patent
Cheong et al.

(10) Patent No.: US 7,751,629 B2
(45) Date of Patent: Jul. 6, 2010

(54) METHOD AND APPARATUS FOR DECODING MIXED CODE

(75) Inventors: Cheol Ho Cheong, Seoul (KR); Tack Don Han, Seoul (KR); Jong Young Kim, Seoul (KR); Eui Jae Kim, Seongnam (KR); Seong Hun Jeong, Seoul (KR); Jae Yun Kim, Seoul (KR); Han Yeong Choi, Seoul (KR)

(73) Assignee: Colorzip Media, Inc., Seoul (KR)

( * ) Notice: Subject to any disclaimer, the term of this patent is extended or adjusted under 35 U.S.C. 154(b) by 1188 days.

(21) Appl. No.: 11/265,521

(22) Filed: Nov. 3, 2005

(65) Prior Publication Data

US 2006/0098241 A1 May 11, 2006

(30) Foreign Application Priority Data

Nov. 5, 2004 (KR) ...................... 10-2004-0089725
Mar. 26, 2005 (KR) ...................... 10-2005-0025240

(51) Int. Cl.
*H04N 1/38* (2006.01)
(52) U.S. Cl. ...................... 382/232; 382/100; 382/113; 358/3.28; 358/463; 713/176; 235/494
(58) Field of Classification Search ................. 382/232, 382/245; 358/3.28; 235/494; 283/113; 713/176
See application file for complete search history.

(56) References Cited

U.S. PATENT DOCUMENTS

2003/0141375 A1* 7/2003 Lawandy .................. 235/494

2003/0147549 A1* 8/2003 Choi et al. .................. 382/100
2003/0179399 A1* 9/2003 Matsunoshita ............. 358/1.13

FOREIGN PATENT DOCUMENTS

| JP | 2001-516480 | 9/2001 |
| WO | 98/50882 | 11/1998 |
| WO | 03/041014 A1 | 5/2003 |

OTHER PUBLICATIONS

Hwang et al., "Watermark in Color Image" IEEE Computer Society Proceedings on the First International Symposium on Cyber Worlds (Cw'02), 2002.*
Japanese Office Action for 2005-322570, 2009.

* cited by examiner

*Primary Examiner*—Bhavesh M Mehta
*Assistant Examiner*—Stephen R Koziol
(74) *Attorney, Agent, or Firm*—Nixon & Vanderhye P.C.

(57) ABSTRACT

Provided are a method and apparatus for decoding a mixed code that is a combination of first and second code images. In the method, a mixed code image is obtained by receiving the original image having the mixed code image and removing noise from the original image. Next, the colors, shades, and brightnesses of pixels of the mixed code image are categorized into groups based on a predetermined threshold, the mixed code image is divided into first and second code images, and first and second information are extracted by decoding the first and second code images, respectively. The first and second code images can be effectively decoded by decoding interpretation information, construction information, error control information, and code direction information stored in the first and/or second code images.

14 Claims, 18 Drawing Sheets

FIG. 9

| RELATIONSHIP | | | BASIC INFORMATION | ADDITIONAL INFORMATION | MIXED CODE INFORMATION |
|---|---|---|---|---|---|
| EQUALITY (=) | | | 1111 | 1111 or "colorzip.com" | 1111 or "colorzip.com" |
| RELATIONAL | | | 1122 | "colorzip" | 11color&22zip |
| APPEND | | | 1111 | 2222 | 11112222 or 22221111, 12121212, 21212121 |
| SUBSET | | | 11112222 | 2222 | 11112222 |
| OPERATION | LOGIC & BINARY OPERATION | ∧ and | 1111 | 0101 | 0101 (=1111^0101) |
| | | NOT | 1111 | NOT (ADDITIONAL INFORMATION = MIXED CODE INTERPRETATION INFORMATION) | 0000 |
| | | ∨ or | 1111 | 0101 | 1111 (=1111∨0101) |
| | | XOR | 1111 | 0101 | 1010 |
| | | NAND | 1111 | 0101 | 1010 |
| | | NOR | 1111 | 0101 | 0000 |
| | | Lshift << | 1101 | 2 | 0100 |
| | | Rshift >> | 1100 | 2 | 0011 |
| | FOUR ARITHMETIC OPERATIONS | + | 1111 | 2 | 1113 |
| | | - | 1111 | 0101 | 1010 |
| | | * | 1111 | 2 | 2222 |
| | | / | 2222 | 2 | 1111 |

FIG. 10

| UNITS OF MIXED CODE | | CONSTRUCTION AND CONTENT |
|---|---|---|
| BASIC INFORMATION REGION | | DATA REGION OF BASIC CODE INFORMATION, MADE USING FIGURE, PATTERN, COLOR, SHADING, SIGN, OR A COMBINATION THEREOF |
| ADDITIONAL INFORMATION REGION | | DATA REGION OF ADDITIONAL INFORMATION IMAGE, MADE USING FIGURE, PATTERN, COLOR, SHADING, SIGN, OR A COMBINATION THEREOF |
| MIXED CODE CONTROL REGION | MIXED CODE CONSTRUCTION INFORMATION REGION | SPECIFY CONSTRUCTION OF BASIC CODE IMAGE AND ADDITIONAL INFORMATION IMAGE, AND DECODING THEREOF<br>- TOTAL NUMBER OF ADDITIONAL INFORMATION ELEMENT IMAGES, TOTAL NUMBER OF SUB-BASIC INFORMATION IMAGES, POSITIONS OF ADDITIONAL INFORMATION ELEMENT IMAGES, TYPES OF ADDITIONAL INFORMATION ELEMENT IMAGES, ENCRYPTION METHOD, AND DIRECTIONS OF ADDITIONAL INFORMATIONELEMENT IMAGES ARRANGED |
| | MIXED CODE INTERPRETATION INFORMATION REGION | SPECIFY RELATIONSHIP BETWEEN BASIC INFORMATION AND ADDITIONAL INFORMATION, AND COMBINING AND DECODING THEM<br>- RELATIONSHIP AND ARITHMETIC OPERATION<br>- INFORMATION FORMAT<br>- INFORMATION ARRANGEMENT<br>- FURTHER CONTROL OF CODE |
| | SERVICE CONTROL REGION | SPECIFY SERVICE DRIVING APPLICATION ACCORDING TO CODE INFORMATION (INVENTORY CONTROL, PIMS, SECURITY CONFIRMATION/AUTHENTICATION, WEB SERVICE, AND MULTIMEDIA SERVICE, ETC.) |
| ERROR CONTROL REGION | ERROR CORRECTION REGION | CORRECT ERROR IN BASIC CODE INFORMATION, ADDITIONAL IMAGE INFORMATION, OR ENTIRE INFORMATION |
| | PARITY INFORMATION REGION | CHECK ERROR IN BASIC CODE INFORMATION, ADDITIONAL IMAGE INFORMATION, OR ENTIRE INFORMATION |
| CODE DIRECTION INFORMATION REGION | | ARRANGEMENT AND DIRECTION DETECTION REGION OF BASIC CODE IMAGE, ADDITIONAL INFORMATION IMAGE, AND MIXED CODE |

FIG. 11

| RELATIONSHIP | | | SIGN |
|---|---|---|---|
| EQUALITY (=) | | | REQ |
| RELATION | | | RRE |
| APPEND | | | RAP |
| SUBSET | | | RSU |
| OPERATION | LOGIC AND BINARY OPERATION | ^ (and) | RAN |
| | | v (or) | ROR |
| | | XOR | RXO |
| | | NAND | RNN |
| | | NOR | RNR |
| | | Lshift (<<) | RLS |
| | | Rshift (>>) | RRS |
| | FOUR ARITHMETIC OPERATIONS | + | RPL |
| | | − | RMI |
| | | * | RMU |
| | | / | RDI |
| | FUNCTION | NOT | RNO |
| | | FUNCTION 1 | RH1 |
| | | FUNCTION 2 | RH2 |
| | | ... | ... |
| TOTAL NUMBER OF FIELDS | | 5 | RF5 |

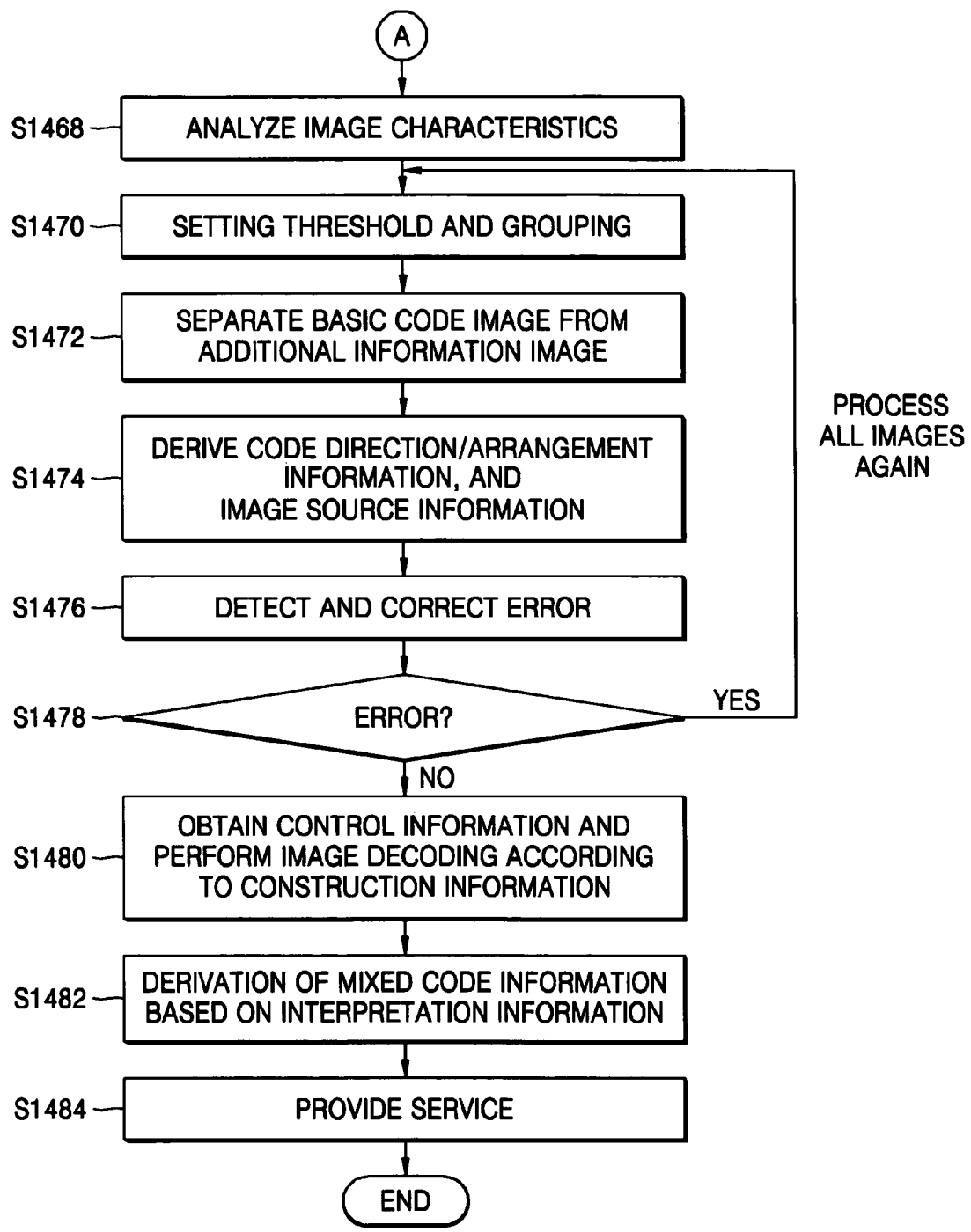

FIG. 15A  FIG. 15B  FIG. 15C
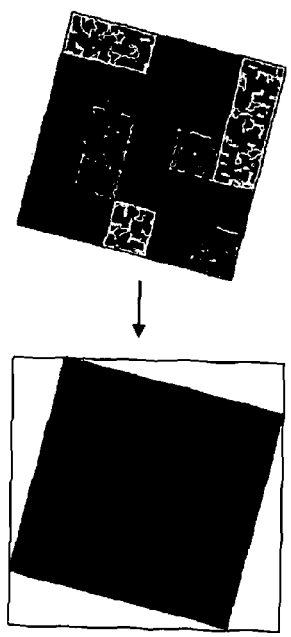 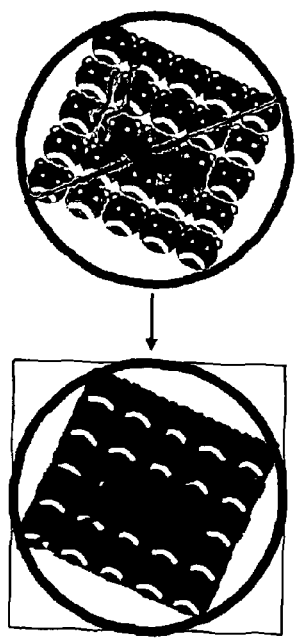 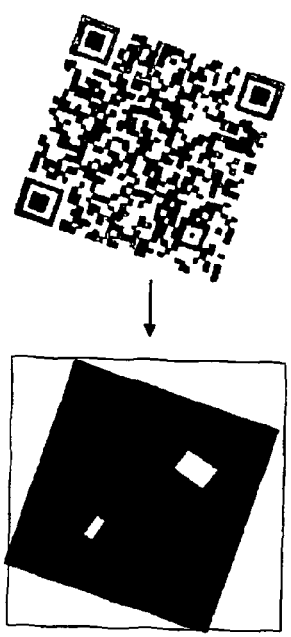
FIG. 16A  FIG. 16B  FIG. 16C
DIRECTION DETECTION REGION
ARRANGEMENT
INFORMATION REGION
LOCATION DETECTION PATTERN
ARRANGEMENT INFORMATION PATTERN
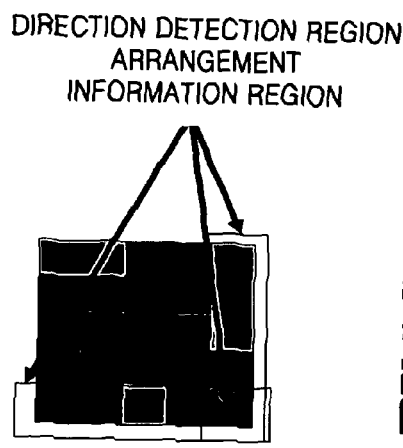 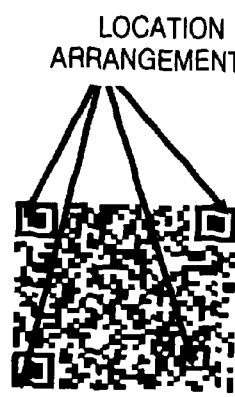 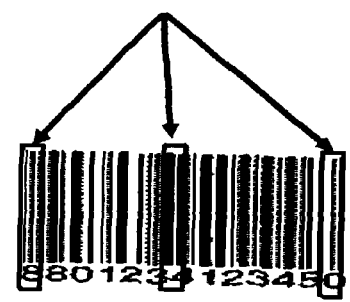

METHOD AND APPARATUS FOR DECODING MIXED CODE

CROSS-REFERENCE TO RELATED PATENT APPLICATIONS

This application claims the priorities of Korean Patent Application No. 10-2004-0089725, filed on Nov. 5, 2004, and Korean Patent Application No. 10-2005-0025240, filed on Mar. 26, 2005, in the Korean Intellectual Property Office, the disclosures of which are incorporated herein in their entirety by reference.

BACKGROUND OF THE INVENTION

1. Field of the Invention

The present invention relates to a method and apparatus for decoding a physical or electronic code image, and more particularly, to a method and apparatus for decoding a code that is a combination of at least two code images (hereinafter referred to as a "mixed code").

2. Description of the Related Art

Recognizable information, such as a character, a number, and a sign, may be expressed as an image in consideration of the security of the information and a space in which the information is to be displayed. To interpret such an image (code image) containing information, a decoder is required.

The code image may be a one-dimensional barcode such as a universal product code (UPC) and an European article number (EAN), and a two-dimensional code such as a color code, a gray code, a quick response (QR) code, a PDF-417 code, and a data matrix. Information may be obtained by recognizing an image and extracting the information from the image using watermarking designed by MarkAny and a technology of recognizing a logo of an image.

Since the image code conceals information and information regarding the code is not disclosed, a user may have difficulties in using the image code. For instance, the user cannot predict whether the image code is available to a general mobile terminal or a personal digital assistant (PDA), whether the image is provided from a personal computer (PC), and whether information is contained in the image code. Also, the amount of data that can be expressed using each code is limited. Thus, in general, an image code must be newly produced whenever data is updated, and it is difficult to include information indicating whether the data is updated into the image code.

In general, watermarking is used to determine whether a user who desires to use an image is an authorized user or has a copyright of the image, or provide network connection services using image information. Therefore, watermarking information is contained in an image not to be disclosed, and is not related to information regarding the image. Even if the watermarking information is related to the information regarding the image, it is impossible to decode the image using the watermarking information. Of course, a watermark can be embedded into a code image, but in this case, the watermark is just combined with the original code image to make a simple combination thereof.

The color barcode is manufactured by mapping colors to a barcode pattern. Although the number of ways to express information can be increased through the color barcode, the color barcode is also a simple combination of the colors and the barcode pattern.

Alternatively, an image can be recognized by a trademark, a logo, or a pattern. In detail, an input image is recognized by preparing a database of a pattern of a specific image, and comparing the input image with a specific image from the database to determine the similarity between the images.

SUMMARY OF THE INVENTION

The present invention provides a method and apparatus for decoding a mixed code that is a combination of first and second code images.

The present invention also provides a method of effectively decoding a mixed code that is a combination of first and second code images by decoding the first code image to extract information and decoding the second code image based on the extracted information.

The present invention also provides a computer readable medium storing a computer program that executes a method of decoding a mixed code that is a combination of first and second code images.

According to an aspect of the present invention, there is provided a method of decoding a mixed code made by overlapping a first code image with a second code image, the method comprising receiving the original image which includes the mixed code; obtaining a mixed code image by removing noise from the original image; dividing colors, shades, and brightnesses of pixels of the mixed code image into groups using a predetermined threshold, and dividing the mixed code image into the first and second code images based on the groups; and decoding the first and second code images to extract first and second information, respectively.

According to another aspect of the present invention, there is provided a method of decoding a mixed code made by overlapping a first code image with a second code image, the method including extracting the first and second code images from the mixed code according to the difference in color and brightness between the first and second code images, such that the first and second code images are separated from each other; obtaining construction information for each of the first and second code images by decoding a data region and a control information region of the first code image; and obtaining second information by decoding the second code image according to the construction information.

According to yet another aspect of the present invention, there is provided an apparatus for decoding a mixed code, the apparatus including an input unit receiving the original image having a mixed code image made by overlapping a first code image with a second code image; a mixed code extracting unit obtaining the mixed code image by removing noise from the original image; a code image separating unit dividing the mixed code image into the first and second code images by categorizing colors, shades, and brightnesses of pixels of the mixed code image into groups based on a predetermined threshold; and an information extracting unit extracting first information and second information by decoding the first and second code images, respectively.

Accordingly, it is possible to easily decode a mixed code that is a combination of the first and second code images.

BRIEF DESCRIPTION OF THE DRAWINGS

The above and other aspects and advantages of the present invention will become more apparent by describing in detail exemplary embodiments thereof with reference to the attached drawings in which:

FIG. 9 is a table illustrating the relationship between basic information and additional information according to an embodiment of the present invention;

FIG. 10 is a table illustrating regions of a mixed code according to an embodiment of the present invention;

FIG. 11 is a table illustrating various relationships between the basic information and the additional information according to an embodiment of the present invention, represented with signs;

FIGS. 14B and 14C are a detailed flowchart illustrating a method of decoding a mixed code according to an embodiment of the present invention;

FIG. 15 illustrates examples of binarization of a mixed code image and a limited rectangular search according to an embodiment of the present invention;

FIG. 16 illustrates a mixed code image with code direction and arrangement information according to embodiments of the present invention;

DETAILED DESCRIPTION OF THE INVENTION

Hereinafter, a mixed code, a method of generating the mixed code, and a method and apparatus for decoding the mixed code according to exemplary embodiments of the present invention will be described in detail with reference to the accompanying drawings.

Figure 1:
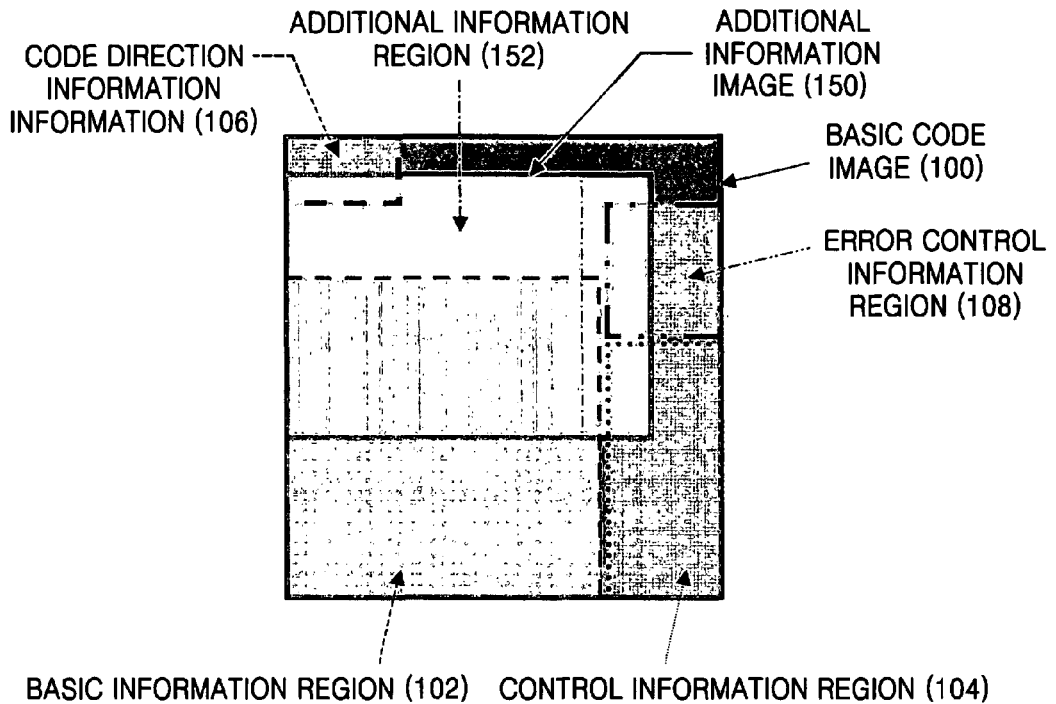
FIG. 1 illustrates a construction of a mixed code according to an embodiment of the present invention.

FIG. 1 illustrates the construction of a mixed code according to an embodiment of the present invention. Referring to FIG. 1, a code expressed with a physical image or an electronic image according to an embodiment of the present invention (hereinafter referred to as a 'mixed code') is composed of a basic code image 100 and an additional information image 150. The additional information image 150 overlaps with the basic code image 100.

The basic code image 100 includes a basic information region 102, a control information region 104 (including a construction information region, a interpretation information region, and a service control region), a code direction information region 106, and an error control information region 108 (including an error verification information region and an error correction information region).

The additional information image 150 includes an additional information region 152, and may further include a control information region, a code direction information region, and an error control region in an additional information image region, if necessary.

Information stored in each of the basic information region 102, the additional information region 152, the control information region 104, the code direction information region 106, and the error correction information region 108, is encoded using colors, shading, a pattern, or a combination thereof. A one-dimensional barcode, such as a universal product code (UPC) and an EAN, and a two-dimensional barcode, such as a color code, a gray code, a QR code, a PDF-417 code, and a data matrix, may be used to encode each region of the basic code image 100 and the additional information image 150.

Figure 2:
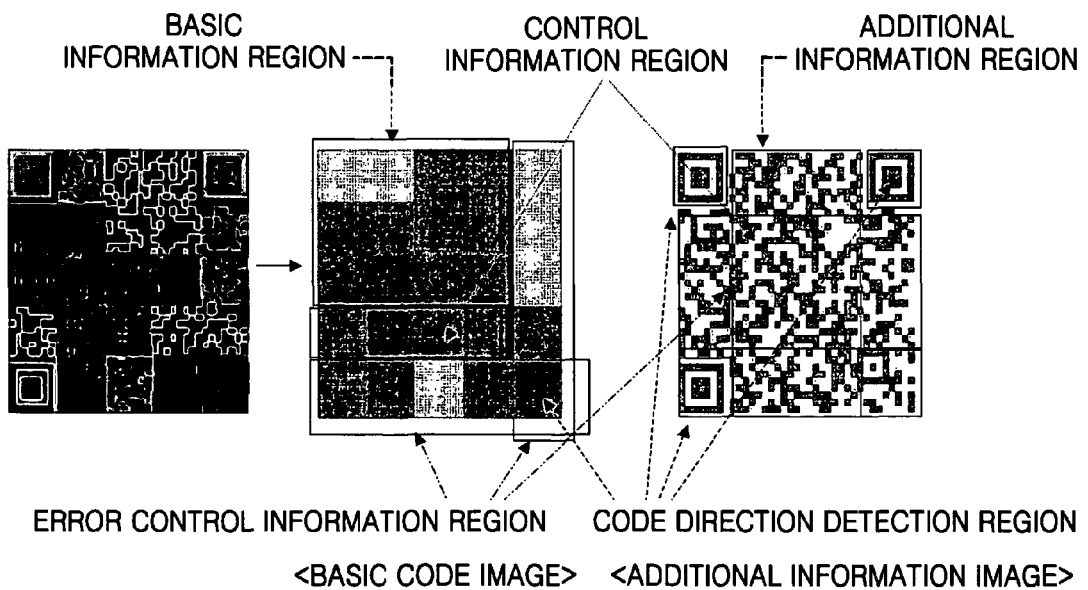
FIGS. 2, 3A, and 3B are a mixed code according to embodiments of the present invention.
Figure 3A:
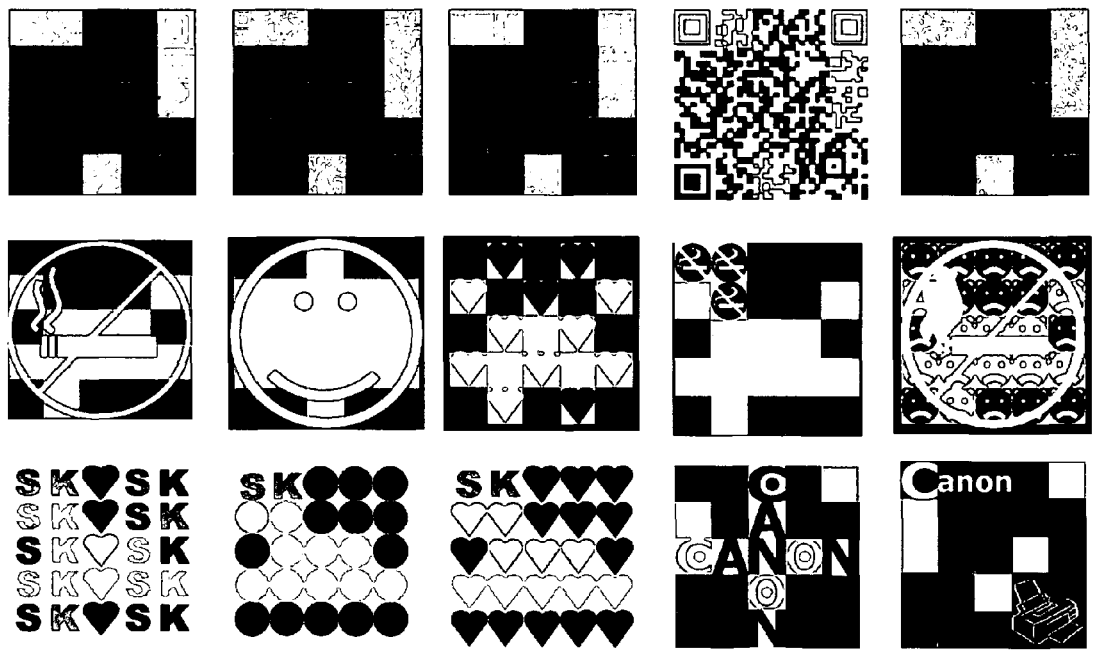
Figure 3B:
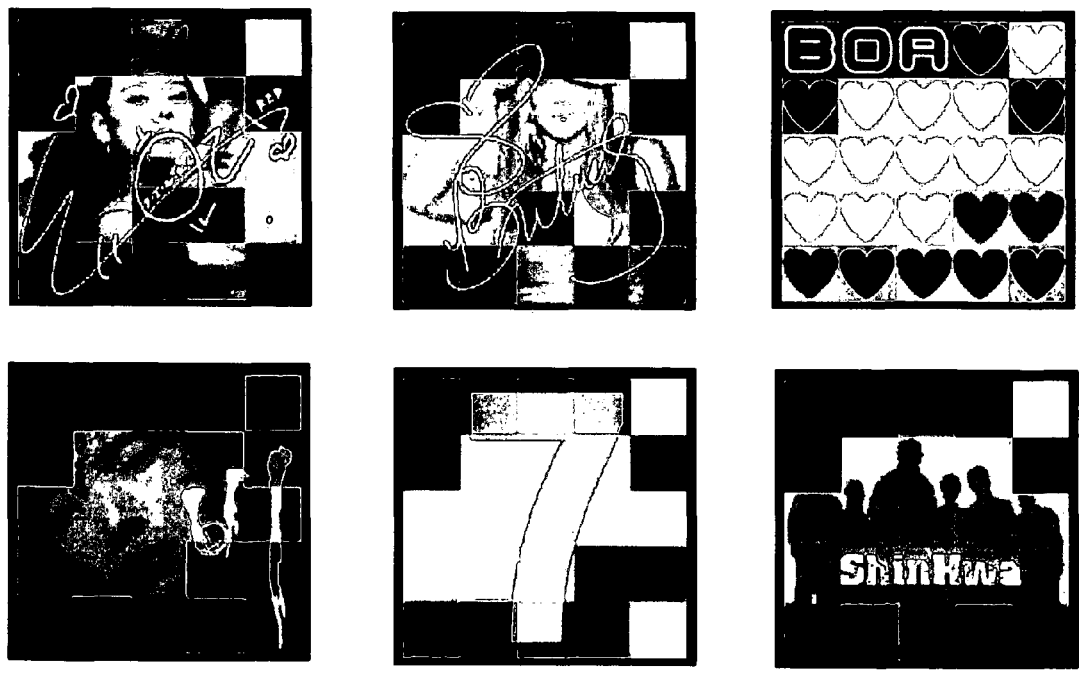

FIGS. 2, 3A, and 3B illustrate a mixed code according to embodiments of the present invention. Referring to FIG. 2, a mixed code includes a basic code image expressed with a color code and an additional information image expressed with a QR code. The basic code image includes a basic information region, a control information region, an error correction information region, and a code direction detection region. The additional information image includes an additional information region, a control information region, an error correction information region, and a code direction information region.

Each region of a mixed code will now be described in greater detail.

1. Basic Information Region

The basic information region is a predetermined part of a basic code image constituting the mixed code. This region contains basic information that is transformed into a code using colors, shading, figures, a pattern, or a combination thereof. That is, the basic information, which can be expressed with characters, numbers, signs, special characters, and images, is transformed into a code represented using colors, shading, figures, a pattern, or a combination thereof according to a predetermined code table, and then stored in the basic information region. In general, a code that is easy to recognize, e.g., a color code, is preferably used as the basic code image.

2. Additional Information Region

The additional information region is a predetermined part of an additional information image that overlaps with the basic code image in the mixed code. This region contains additional information that is represented with an image obtained using colors, shading, figures, a pattern, a mark, a sign, or a combination thereof. That is, the additional information, which can be expressed with characters, numbers, signs, special characters, images, and a logo, is transformed into a code represented using colors, shading, figures, characters, marks, symbols, or a combination thereof according to a predetermined code table, and then stored in the additional information region.

If the additional information image is a code, the additional information region is formed as a part of the additional information image. When there are a plurality of additional information images, some of sets thereof are used as the additional information region.

The additional information may include only a symbol, a signal, a trademark, and a character. For instance, when the additional information is represented with a symbol, the additional information image may further include a region (control information region, etc.) that stores information regarding the type, orientation, and arrangement of the symbol, and the symbol pattern (the similarity between the symbol pattern and another pattern).

3. Control Information Region (Construction Information Region, Interpretation Information Region, and Service Control Region)

3.1 Construction Information Region

The construction information region stores information regarding the constructions of the basic code image and the additional information image, and methods of decoding them. Thus, the method of decoding the additional image can be easily determined by decoding the construction information region. It is possible to add new construction information to or cancel the stored construction information from this region, if required.

Basically, the construction information preferably includes information regarding the types of a code in the additional information image (the color code, the QR code, the PDF-417 code, and so on), and the other information may be added to or deleted from the construction information as it demands.

The construction information region is included in the control information region(s) of the basic code image and/or the additional information image. However, since a code that is easier to recognize is preferably constructed as the basic code image, the constitution information region is preferably included in the control information region of the basic code image.

Table 1 shows examples of information stored in the construction information region of the mixed code.

TABLE 1

| Number of Additional Information Element Images | Number of Sub-basic Information Images | Positions of Additional Information Element Images | Types of Additional Information Element Images | Encryption Method | Orientation of Additional Information Element Images |
|---|---|---|---|---|---|

As illustrated in Table 1, the construction information region stores information regarding the total number, positions, types, and orientation of additional information element images, the total number of sub-basic information images, and methods of encrypting them.

(1) Number of additional information element images: A total number of images constituting a part of the additional information image that overlaps with the basic code image (2) Number of sub-basic information images: A total number of sub-basic information images obtained by dividing the basic code image into equal parts (3) Positions of additional information element images: The positions of the additional information element images are easily determined by allocating random numbers to the sub-basic information images according to the number of the sub-basic information images and determining the number allocated to a sub-basic information image located at the center of the additional information element images.

(4) Types of additional information element images: The type of a code in each additional information element image, the center of which is designated in information regarding the positions of he additional information element images in a sub-basic information image of the mixed code.

Table 2 shows information regarding various types of a code in each additional information element image in each sub-basic information image.

TABLE 2

| Image Type | 5x5 Color Code | QR | PDF 417 | Character | Sign | Trademark | Photo | Symbol |
|---|---|---|---|---|---|---|---|---|
| Information Value | 1 | 2 | 3 | 4 | 5 | 6 | 7 | 8 |

Referring to Table 2, different information values are allocated to various types of codes of the additional information element images, e.g., a 5×5 color code, the QR code, the PDF417 code, a character, a sign, a trademark, a photograph, and a symbol.

(5) Encryption Method: An encryption method used to encrypt each additional information element image. Information regarding the encryption method may further specify an error correction level or a technique available. For instance, the encryption method may be defined as shown in Table 3.

TABLE 3

| Value | Encryption Method |
|---|---|
| 0 | None |
| 1 | Watermark |

TABLE 3-continued

| Value | Encryption Method |
|---|---|
| 2 | Turbo Code |
| 3 | Encryption Method 3 |

(6) Orientation of additional information element images: A direction in which each additional information element image is arranged in the basic code image. An additional information element image is read as specified in information regarding the orientation thereof.

0: no inclination

1: inclination of 45 degrees

2: inclination of 90 degrees

3: inclination of 135 degrees

4: inclination of 180 degrees

5: inclination of 225 degrees

6: inclination of 270 degrees

7: inclination of 315 degrees

Examples of construction information will now be described in greater detail.

(1) When the construction information is indicated with '441234222200030020':

TABLE 4

| Number of Additional Information Element Images | Number of Sub-basic Information Images | Positions of Additional Information Element Images | Types of Additional Information Element Images | Encryption Method | Orientation of Additional Information Element Images |
|---|---|---|---|---|---|
| 4 | 4 | 1 2 3 4 | 2 2 2 2 | 0 0 0 3 | 0 0 2 0 |

Referring to Table 4, when the code in the basic code image is a color code made using various colors and the construction information region is recognized from the color code, the basic code image includes four additional information images that overlap with one another (see the total number of additional information element images), the basic information image is divided into four equal parts (see the total number of sub-basic information images), and the four additional information images are added to the centers of the equal four parts, respectively (see the positions of additional information element images). Also, the four additional information images are QR code images according to the types of the additional information element images, and a third additional information element image is rotated by 90 degrees but the other additional information element images are maintained at their original positions (see the arrangement of the additional information element images). Also, the encryption method illustrated in Table 4 reveals that three QR codes are not encrypted but a fourth additional information element image is encrypted using "encryption method 3".

Figure 4:
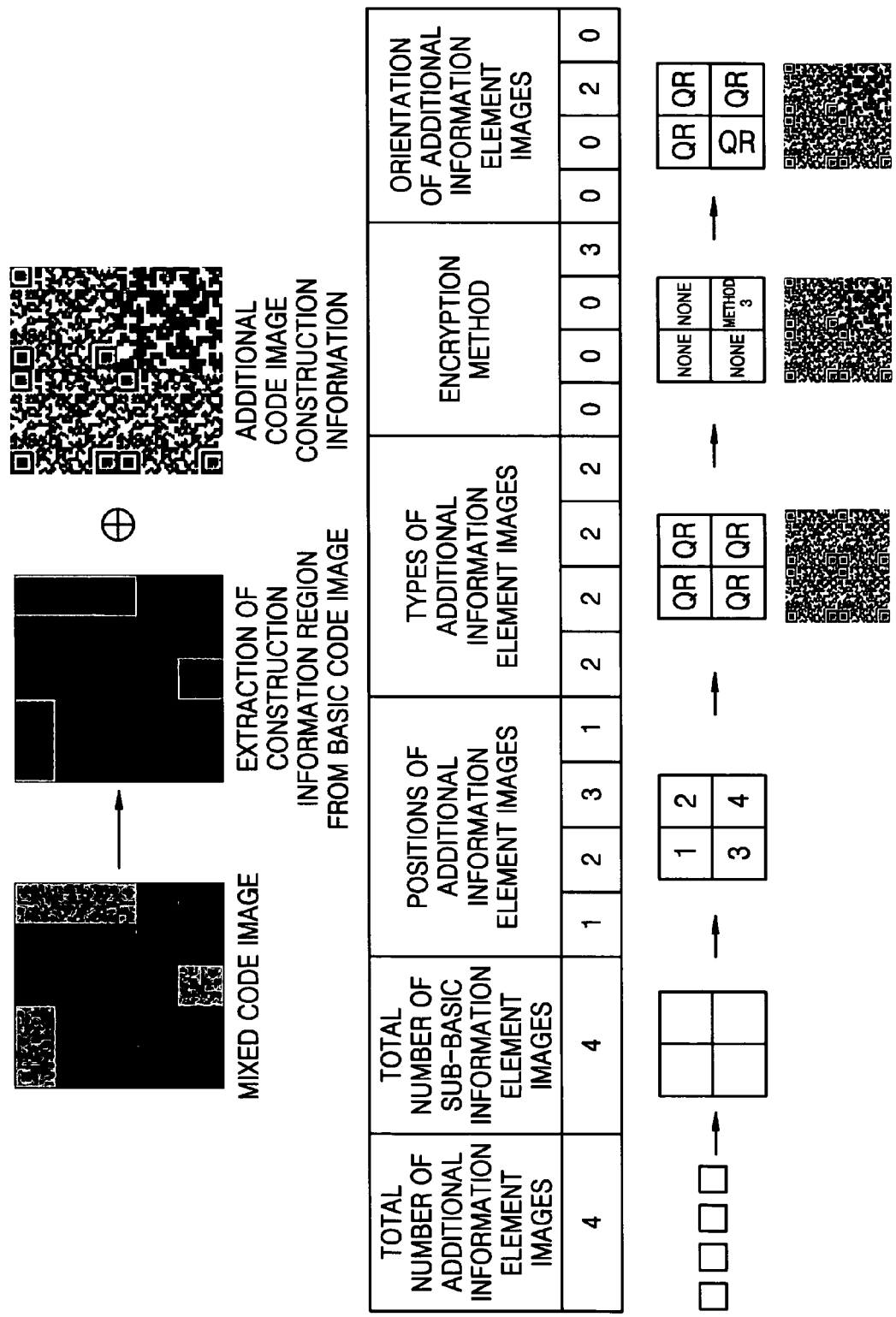
FIG. 4 illustrates a process of recognizing construction information of a mixed code according to an embodiment of the present invention.

FIG. 4 illustrates a mixed code, and a process of recognizing construction information regarding the mixed code shown in Table 4.

(2) When the construction information is represented as '111100' (see Table 5)

TABLE 5

| Number of Additional Information Element Images | Number of Sub-basic Information Images | Positions of Additional Information Element Images | Types of Additional Information Element Images | Encryption Method | Orientation of Additional Information Element Images |
|---|---|---|---|---|---|
| 1 | 1 | 1 | 1 | 0 | 0 |

Referring to Table 5, when the code in the basic code image is the QR code, a total number of additional information images is one, and the additional information image is a 5×5 color code that is not encrypted and rotated. Also, according to the number of sub-basic information images and the positions of the additional information element images, the color code is almost equivalent to the QR code in size and the central point of the color code is identical to that of the QR code. If the color code is 1/9 times smaller than the QR code and the central point of the color code is identical to that of the QR code, the number of the sub-basic information images is changed to 9 and the positions of the additional information element images is changed to 5. That is, the color code is located at the center of the QR code that is 9 times larger than the color code.

Figure 5:
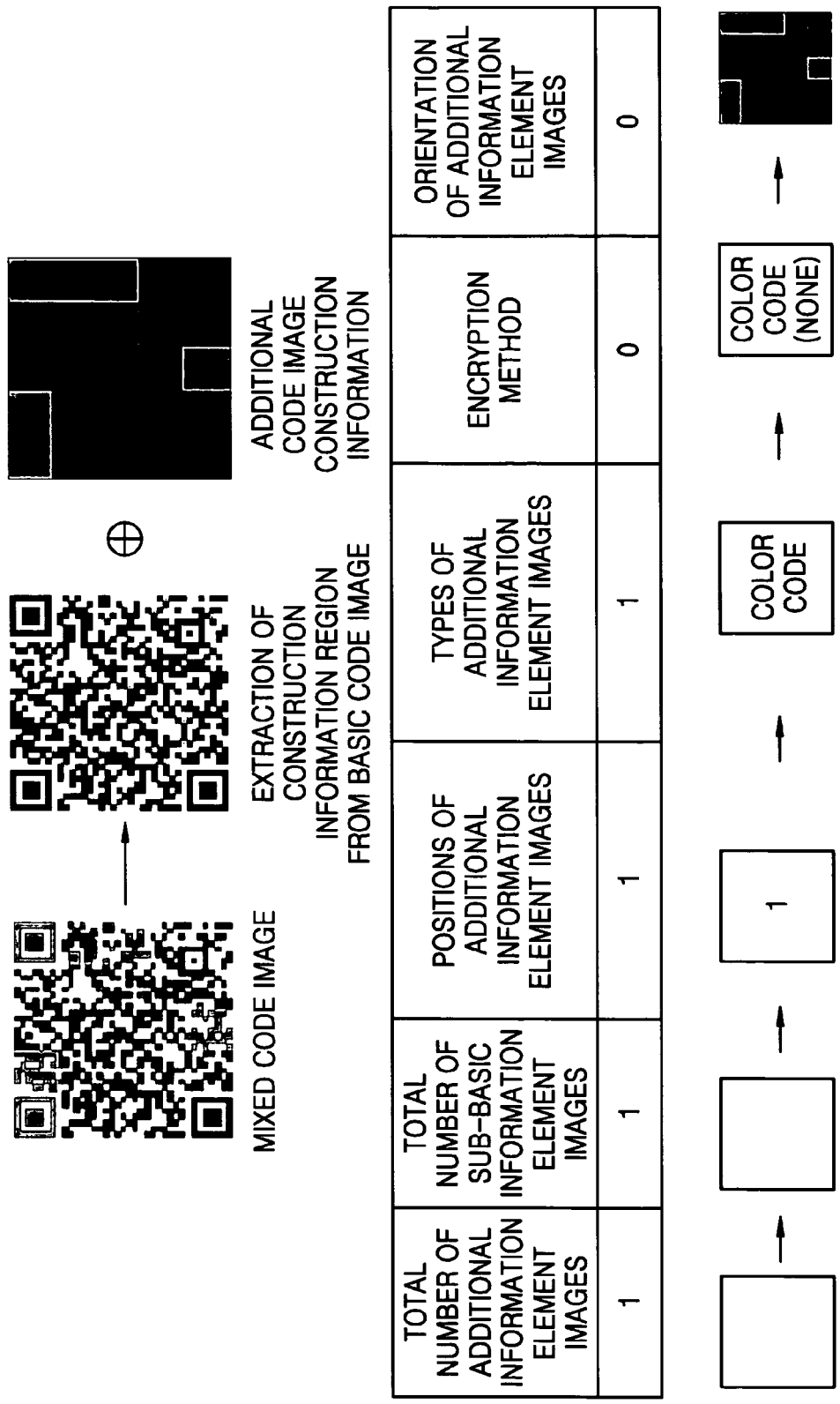
FIG. 5 illustrates a process of recognizing construction information of a mixed code according to another embodiment of the present invention.
Figure 6:
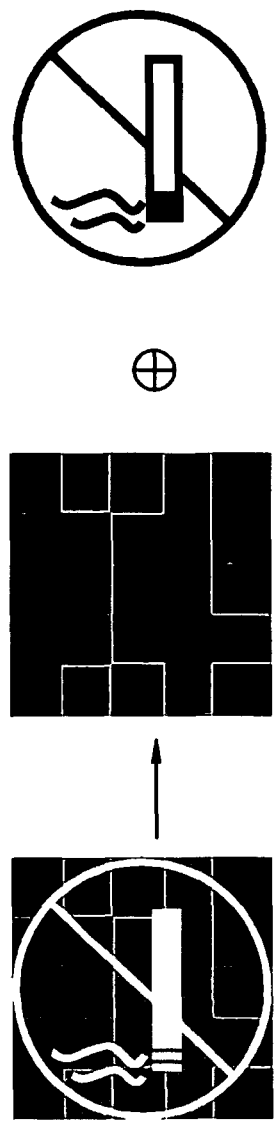
FIGS. 6 through 8 illustrates construction information of a mixed code according to embodiments of the present invention.
Figure 7:
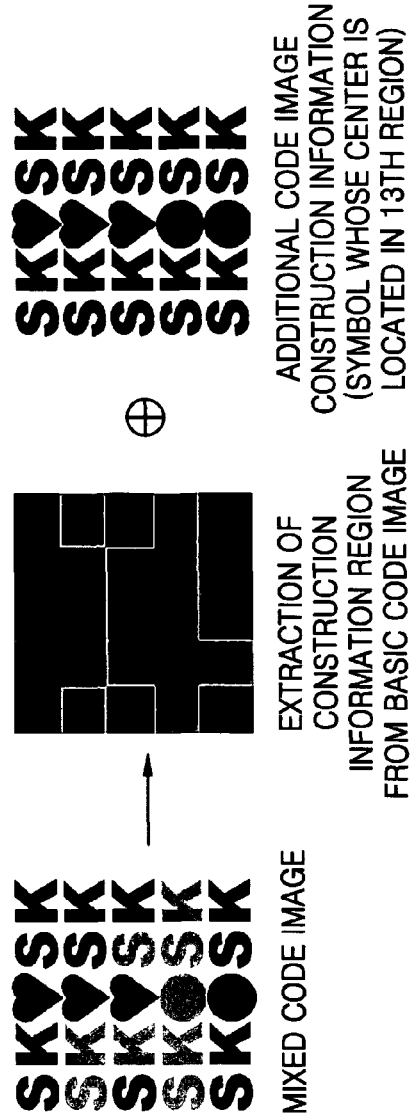
Figure 8:
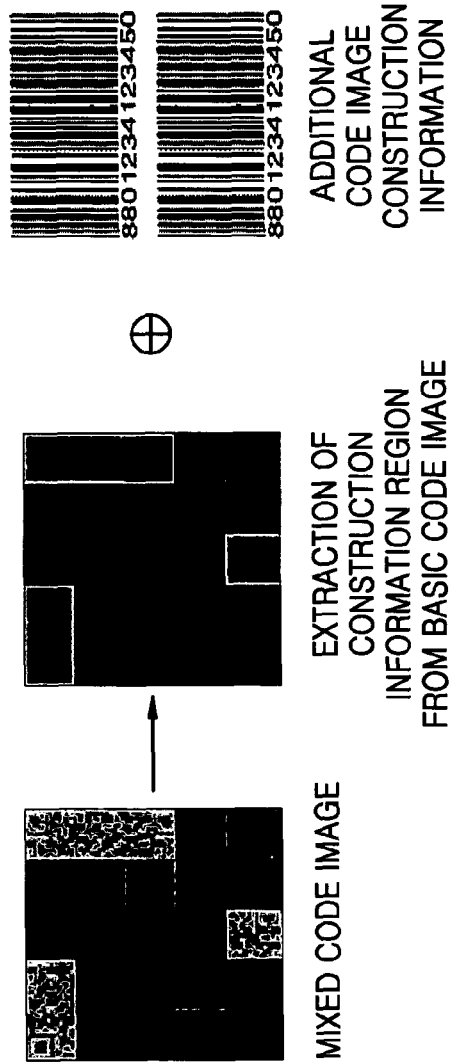

FIG. 5 illustrates a mixed code, and a process of recognizing construction information regarding the mixed code shown in Table 5. FIGS. 6 through 8 illustrate other embodiments of construction information regarding a mixed code according to the present invention.

As described above, the construction information region is preferably included in the basic code image so that the entire mixed code image can be easily decoded.

3.2 Interpretation Information Region (Relationship, Information Format, and Arrangement of Information)

The interpretation information region stores interpretation information useful to interpret the mixed code. The interpretation information specifies the relationship between the basic information and the additional information, a manner in which the basic information and the additional information are combined, and a manner in which the basic information and the additional information are decoded. The interpretation information region is located in the basic code image and/or the additional information image. In detail, the interpretation information defines the relationship between the basic information and the additional information, the formats of the basic information and the additional information, a manner in which the basic information and the additional information are arranged, and further control of code.

3.2.1 Relationship (see FIG. 9)

FIG. 9 is a table illustrating the relationship between the basic information and the additional information. Referring to FIG. 9, the relationship between the basic information and the additional information may be defined as an equal relation, a linking relation, an additional relation, a subset relation, and an arithmetic relation.

(1) Equal Relation: Basic information=Additional information

The basic information may be identical to the additional information. In this case, the format of the basic information may not be identical to that of the additional information. For instance, it is assumed that the code of the basic code image is a color code and the code of the additional information image is a QR code. When the result of decoding the basic information region is "1111", an additional information region of a QR code image (additional information image) may also be decoded as "1111".

(2) Combination: Basic information+Additional information

Information regarding the mixed code is made by combining the basic information and the additional information.

If the mixed code has information representation of "11112222", "1111" and "2222" may be encoded as the basic information and the additional information, respectively. It is possible to express various types of information by making a mixed code by adding various types of additional information images to the basic code image.

(3) Subset Relation: Basic information ⊂ Additional information or Basic information ⊃ Additional information Information regarding the mixed code may be equivalent to one of the basic information and the additional information. For instance, when ten goods are put in a box, a mixed code of the box is obtained by encoding information represented as 1000 through 1010, and the goods have code images corresponding to 1000 through 1010, respectively. Thus, the mixed code for the box is decoded to obtain information regarding the goods in the box.

(4) Binary Operation: The interpretation information specifies a binary operation to be performed on basic information and additional information regarding the mixed code.

(5) Four Arithmetic Operations: The interpretation information specifies four arithmetic operations to be performed on the basic information and the additional information of the mixed code.

3.2.2 Information Format

The interpretation information defines the formats of the basic information and the additional information. The same code may be decoded in different formats, using characters, numbers, signs, or images. For instance, the same code can be decoded into "color", "636F6C6F72", i.e., hexadecimal digits, or "099111108111114", i.e., binary digits. Accordingly, the mixed code can be decoded variously depending on the format of the basic information, the additional information or a combination thereof.

3.2.3 Information Arrangement

The positions of pixels of basic information image and the additional information image may be changed, if required. For instance, it is possible to change an absolute or relative position of each pixel of a QR code disposed on a color code using a predetermined transformation method. In this case, arrangement of information defined in the interpretation information region is decoded and the code of the additional information image is decoded according to the result of decoding.

In general, changing the position of each pixel of an image is applicable to a service that requires an additional information image to be encrypted. For instance, it is possible to determine whether a person's picture is identical to a passport photograph by transforming the passport photograph into an additional information image, including the additional information image into a mixed code, and decoding it using a region storing information regarding arrangement of information. When using an additional information image that is a code for an authentication service, for example, additional information image can be protected by changing the positions of pixels thereof. In this case, it is preferable that encryption and decryption algorithms are embedded into a program and the additional information image is processed after reading the information regarding the arrangement of information from the mixed code. In particular, a degree of encrypting the additional information image can be increased by further using an algorithm using a key value and a method thereof.

The information regarding the arrangement of information appears to be similar to the location information and the orientation information of the additional information image which are included in the construction information of the mixed code. However, the information regarding the arrangement of information is different from them in that it is obtained in pixel units or units that are less than the element-image units, not in the unit of the additional information image

3.2.4 Further Control of Code

An additional information image may later be overlapped with or added to the basic code image. For instance, when only a color code image has been used, a barcode may be added to overlap with the color code to provide further, various services. Information regarding the added images is stored in the additional information image.

(1) Addition: Additional information is added to information stored in a basic code. For instance, an additional information image is further printed on a document printed with a basic code image for document management. Also, information regarding the address of a video presentation file may be added to the original document. In this case, a control information region is added to the additional information image with an additional information region.

(2) Deletion: An additional information image, e.g., regarding the term of validity of the basic code image, may further be printed on a basic code image, thereby erasing information linked to the basic code image or preventing the information from being used.

(3) Modification: The original code information is changed by appointing a portion thereof to be changed when changing of a telephone item of a business card, for example.

3.3 Service Control Region

In the service control region, services that additionally use the mixed code are appointed so as to run an application program according to a way in which each service is provided or controlled and to provide various services using the relationship between the basic information and the additional information.

For instance, when the basic code image is used to represent the identification (ID) of a user and the additional information image is a photograph image of the user, they can be used in various services, such as a business card information service, a passport authenticating service, a simple photo information service, and an individual web site service, according to information to be defined in the service control region.

The information in the service control region is closely related to the interpretation information region of the mixed code. However, specifically, the interpretation information concerns an operation to be performed to constitute and interpret information regarding the mixed code, whereas the information in the service control region concerns operating of an application. For instance, the information in the service control region is used in operating a specific application, designating a user interface, or determining the address of a database server.

4. Error Control Region

The error control region stores information required to determine whether an error occurs in decoding the mixed code, and correct the error. The error control region is preferably included in both the basic code image and the additional information image in order to detect an error in each image. Such a process is preferably performed on the entire mixed code. However, the inclusion of the error control region into the additional information image is optional, particularly, when the additional information image is a symbol, a mark, or a photograph image.

Various, general methods such as a parity technique or a check bit operation may be used to determine whether an error occurs in decoding the mixed code, and a typical error correction technique such as a Reed-Solomon code may be applied to correcting the error.

5. Code Direction Information Region (Direction Detection and Arrangement Region)

The code direction information region (direction detection and arrangement region) is included into one of or both the basic code image and the additional information image. Inclusion of the code direction information region is preferable, since it provides a reference point of an image and basic information required to determine a sequence in which the basic code image or the additional information image is decoded.

The code direction information region is constructed using a general technique using a specific pattern, sign, symbol, or parity operation, so that this region can be easily detected.

For instance, the code direction information region may be constructed using starting, ending, and interim descriptors of a barcode or a PDF-417 code; a pattern for detecting the location of a QR code or a data matrix code; a method of determining a sequence in which color cells are arranged; a method of determining whether a mark/character is located at its original position (a pattern matching method); or a method of determining intersecting cells of multiple parity cells (a method of determining a position at which a particular column intersects with a particular row, using a parity procedure different from a parity procedure applied to columns and rows).

In general, the code direction information region is preferably included in the basic code image so that this region can be easily detected. Inclusion of a code direction information region into the additional information image is optional. However, the inclusion of the code direction information region enables various uses of the additional information image.

In other words, it is possible to increase the amount of information to be expressed or diversify the use of the mixed code by arranging the basic code image and the additional information image in different directions. Thus, the mixed code is highly likely to be made by changing the original direction in which one of the basic code image and the additional information image is arranged. As noted from the construction information of the mixed code, even when one of the additional information image and the basic code image does not include the code direction information region, the direction information of one image of the mixed code may be included in the other images of the mixed code. However, both the basic code image and the additional information image preferably include the code direction information region to guarantee image recognition. The above regions of the mixed code are specified in a table illustrated in FIG. 10.

A method of generating a mixed code according to an embodiment of the present invention will now be described.

1. Determination of the Information Regarding the Mixed Code

Information to be expressed using the mixed code is determined. The information may be represented with a character, a number, a sign and/or an image (pattern, logo, photograph, etc.), or may be content. Also, the information maybe transformed into content-related information through a predetermined method.

2. Determination of the Control Information Regarding the Mixed Code

The information to be expressed using the mixed code is divided into the basic information and the additional information. Thus, the amounts and types of the basic information and the additional information may vary depending on the relationship between the basic information and the additional information. Further, the control information is required to make the basic information and the additional information such that their constructions can be easily recognized.

For instance, the code types of the basic code image and the additional information image, the total number of element images of the additional information image, and arrangement of the additional information image vary depending on the amounts of the basic information and the additional information.

The control information of the mixed code is divided into the interpretation information and the construction information. The interpretation information is preferably determined after determination of the construction information, since the amount and construction of the information regarding the mixed code depend on he definition of the interpretation information. Thus, after determining the control information (interpretation information and construction information), the contents and constructions of the basic information and the additional information are defined.

In general, when being encoded in the control information region of the mixed code, the control information is preferably encoded in a predetermined information format, that is, using a format of numbers and characters. In this case, the basic code image and the additional information image can easily be decoded by decoding the control information region of the mixed code prior to interpreting the mixed code and decoding the basic code image and the additional information image based on the result of decoding.

2.1 Determination of Interpretation Information Regarding Mixed Code

In this operation, the interpretation information required to interpret the mixed code is set. Specifically, the interpretation information defines the relationship between the basic information and the additional information; a combination of the basic information and the additional information by performing an operation thereon, the formats of the basic information and the additional information, and arrangement of the basic information or the additional information. The interpretation information mixed code is preferably included in the control information region (interpretation information region). However, when the interpretation information is included in a decoding program, whether the interpretation information is to be included in the mixed code depends on the relationship between the basic information and the additional information.

For instance, when a mixed code includes a color code and a 21×21 cell size QR code that are encoded into the basic code image and the additional information image, respectively, the interpretation information may be determined in a program to specify that the basic information is identical to the additional information, that they are made using numbers and characters, and an encryption method. In this case, the control information region (interpretation information region) is not included in the mixed code.

2.1.1 Determination of Relationship

When the information regarding the mixed code is divided into the basic information and the additional information, the relationship between the basic information and the additional information must be set. For instance, if the basic information and the additional information are identical to each other, both of them are encoded using the same information, and if they are combined to form the mixed code, the mixed code is divided into the basic information and the additional information and they are separately encoded.

When each of the basic information and the additional information includes the other, one of them is encoded as the entire information regarding the mixed code and the other is encoded as a part of the information regarding the mixed code. The basic information or the additional information may be in an arithmetic relation if required. In this case, the information regarding the mixed code can be derived by performing an operation on one of the basic information and the additional information using the other information.

One of the basic information and the additional information may be used as a key value or an index of the other. In this case, when one of the basic information and the additional information is constructed as a field, data regarding a field corresponding to the other information can be obtained using a key value of the field. Also, one of the basic information and the additional information may be a key value and the other information may specify a Hash function used to calculate a specific function, particularly, a reverse function. In this case, it is possible to create new information as the information regarding the mixed code by applying the key value to the Hash function. Specifically, the key value is obtained by taking a reverse function of a value of the mixed code, and a function and a key value are computed as the basic information and the additional information. FIG. 11 is a table illustrating various relationships between the basic information and the additional information using signs, according to an embodiment of the present invention.

2.2.2 Definition of Information Format

The formats of the basic information and the additional information may be defined using the relationship between the basic information and the additional information and the information regarding the mixed code. The information regarding the mixed code may specify whether the format of each of the basic information and the additional information is a character format, a value format, a sign format, or an image format.

For instance, the same information can be decoded into "color", "636F6C6F72", i.e., hexadecimal digits, or "099111108111114", i.e., binary digits. Otherwise, the information may be expressed with a predetermined sign, symbol, or pattern construction information representation of a color paint icon. In particular, an image may be represented using a series of RGB values.

In most cases, the formats of the basic information and the additional information are different from each other, and thus, both the formats of the basic information and the additional information are preferably specified.

Table 6 illustrates various formats of information contained in the mixed code.

in an image, e.g., a photograph image, or high-degree encryption of information is required, the order of the information is changed or the information is encrypted using a predetermined transform technique. In this case, an algorithm by which the transformed information is recovered to its original state is required. Also, it is effective to set an information value (key value) that indicates a change in the sequence or arrangement of the basic information and the additional information.

2.1.4. Definition of Service Information

Information regarding an application to be executed based on the basic information or the additional information is preferably set, because the mixed code is applicable as information to various types of applications. However, when use of the mixed code is obvious or has been set by programming the information regarding an application may not be set.

2.2 Determination of Construction of Mixed Code

The formats and amounts of the basic information and the additional information are determined the control information regarding the mixed code. Thus, the types and constructions of the basic code image and the additional information image that represent the basic information and the additional information must be determined according to the control information. In this case, the amount of data, the characteristics of a medium onto which the images are to be printed, a recognition method, and a service manner must be considered.

That is, when the mixed code has a large amount of information and is used to express information, the QR code, the PDF417 code, the data matrix, or an ultra code may be used to represent as a part of an image constituting the mixed code. However, when the mixed code is not used to express information and digital content is to be imported via a network, a combination of the color code, a cyber code, and a one-dimensional (1D) barcode may be used.

If the mixed code is to be made such that information contained therein can easily be recognized by a user, an additional information image of the mixed code is preferably made of characters, a trademark, a sign, a mark, or a pattern.

If the mixed code is to be printed onto a color printing medium, a color code or a color image may be used, and if the mixed code is to be printed onto a black-and-white color printing medium, a gray code or a black-and-white image may be used.

TABLE 6

| Type | Decimal Number | English Mode | Chinese Mode | Korean Mode | Japanese Mode | Sign | RGB | Gray | Pattern | YUV | ... |
|---|---|---|---|---|---|---|---|---|---|---|---|
| Information Value | 1 | 2 | 3 | 4 | 5 | 6 | 7 | 8 | 9 | 0 | ... |

$f_{type}$(basic information format 1 + additional information format 2) = T12

For instance, when the basic information is made of numbers and the additional information is made of English characters and numbers, the information in the mixed code is preferably encoded in a T12(Type 1 & 2) format. The English mode shown in Table 6 supports use of both English characters and numbers.

2.1.3 Definition of Arrangement of Information

When encoding basic information and the additional information, it is possible to change a sequence or arrangement in which they are located if required. As described above, when it is preferable that code information does not appear directly Different recognition methods must be applied to a high-definition display apparatus such as a scanner and a low-definition display apparatus such as a mobile phone camera. When using a mobile phone camera, the color code, a two-dimensional (2D) code or barcode that requires a small number of cells, a simple pattern, or a small amount of characters, numbers, or a trademark image may be used. Use of the high-definition display apparatus enables more types of images to be used and a large amount of information to be obtained through a decoding process.

It is preferable that a user determines the construction of the mixed code by selecting desired ones of programmable combinations or pieces of element information that are determined in consideration of the amount of data, a recognition method, the characteristics of a medium, and the type of a service and provided via a user interface. Otherwise, once the user determines a minimum of characteristics of the mixed code, the construction of the mixed code may be automatically set according to a program. That is, for instance, when the types of the basic code and the additional image are determined, the most desirable total number or sizes of cells (or modes) are determined according to the program.

The construction information region of the mixed code stores the construction information regarding the basic code. In addition, as described above, the construction information region may further store information regarding a total number, locations, and types, and orientations of additional information element images, a total number of sub-basic information images, and an encryption method.

In particular, in the encryption method, the additional information element images are encrypted, using watermarking or other encoding techniques, for example. It is effective to set a code, an image of which is easy to detect and decode, as the basic code, and make the control information to decode and make use of the additional information image.

3. Determination of Basic Information and Additional Information

The formats of the basic information and the additional information, and the relationship between the basic information and the additional information are set according to the control information. The basic information and the additional information, which are encoded to make the mixed code, are determined according to the formats of the basic information and the additional information, and the control information. The basic information and the additional information may be made in a character format, a number format, a sign format, a symbol format, or a pattern format. Each of the basic information and the additional information is transformed into colors, brightness, a shade, a pattern, symbols, characters, signs, or a logo according to a predetermined transform table. The results of transforming the basic information and the additional information are included into a data region of the mixed code image (the basic information region or the additional information region).

4. Determination of Error Correction Region

The error correction information regarding the basic information and the additional information is set. One or at least two of check bits, parity information, and error correction information may be used as the error correction information.

It is preferable that the error correction information is obtained by separately performing an operation on each of the basic information and the additional information to check an error therein, thereby reducing a time required to perform the operation. However, the error correction information may be obtained by performing the operation on the entire mixed code, if required. In particular, when the information regarding the mixed code is to include both the error correction information and the parity information (or the check bits), the parity information is preferably generated after generation of the error correction information. This is because it is possible to first detect the location of an error by using a parity operation, and make it possible to use a part of the result of the parity operation in detecting the location and orientation of a code, e.g., the color code.

The check bits are used to detect an error in the barcode, and the parity operation is obvious to those of ordinary skill in the art. The Reed-Solomon code operation is a representative error correction technique. In the case of the QR code and the PDF417 code, each having a predetermined error correction region, the predetermined error correction region may be used. If one of two pieces of information is encoded to an image or a logo, inclusion of the error correction region is optional. In contrast, inclusion of the error correction region into the basic code is required. Also, information regarding the degree of an error correction rate may be made in a specific part of the error correction information region or in the order of cells, together with the error correction region.

5. Determination of Code Direction Information

After determining the information regarding the mixed code, the code direction information region (direction detection and arrangement region) to be included into the mixed code image must be made. Direction detection and arrangement information stored in the code direction information region may be represented with a specific pattern or a figure, such as the barcode or the QR code, or by using a part of the parity information based on a fact that an operation to be performed on a specific cell is different from that to be performed on the other cells in a color code, for example.

The direction detection and arrangement information may be contained in both the basic code image and the additional information image, but it must be contained in the mixed code image.

6. Determination of Basic Code Image and Additional Information Image

The predetermined basic information, additional information, control information, error control information, and code direction information are divided into the basic code image and the additional information image so as to virtually set images. Each information is transformed into a color, brightness, a shade, a pattern, a sign, a symbol, a trademark, or a character according to a code transform table, and is used as a constitutional element of the basic code image or the additional information image. The arrangement and sizes of the basic code image and the additional information image may be made based on the construction information of the predetermined control information, and the basic code image and the additional information image may be made based on information regarding encryption method.

7. Computing and Compensating for Difference in Color and Brightness Between Basic Code Image and Additional Information Image To combine the set two images, the difference in color and brightness between them is determined using a predetermined algorithm and apparatus. For instance, the difference in color between them is increased for easy separation of the two images, and the difference in color and brightness between them is reduced to conceal the additional code image. Based on the predetermined control information, it is possible to increase or reduce the difference in color and brightness between the images in consideration of the use of a service and the encryption method.

Figure 12:
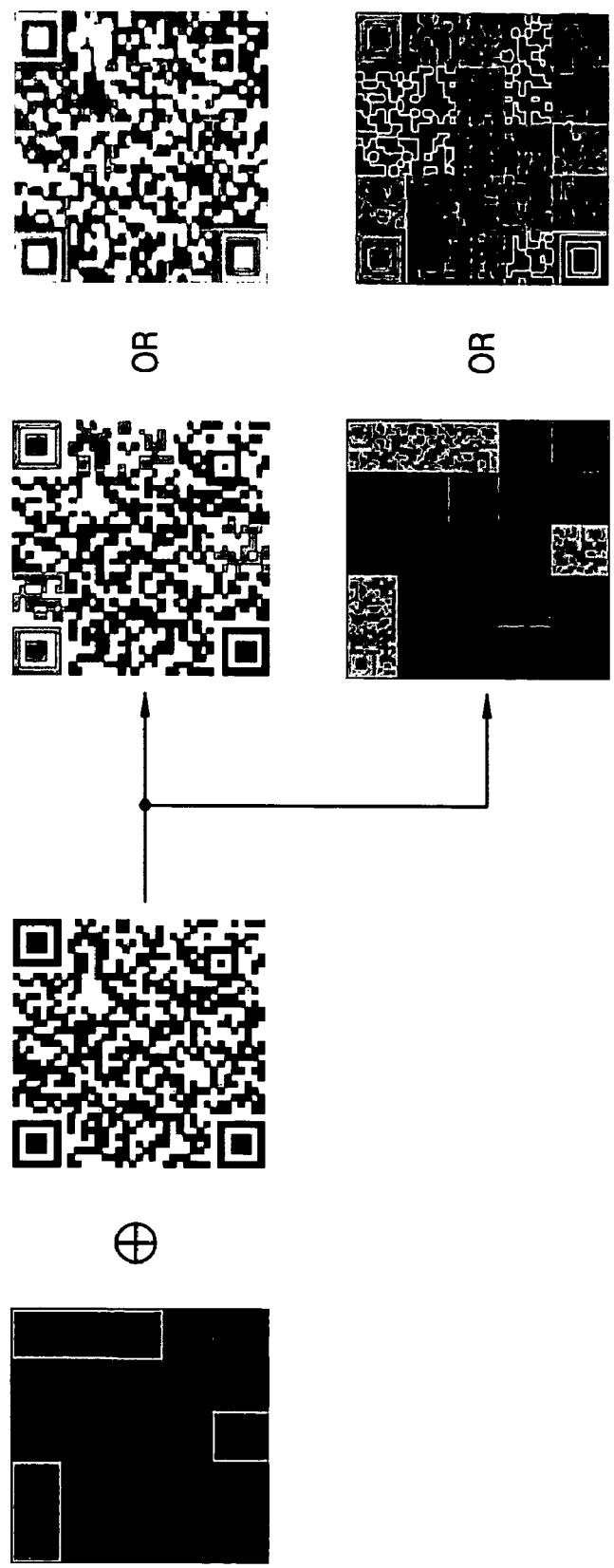
FIG. 12 illustrates examples of a mixed code composed of a color code image and a QR code image according to an embodiment of the present invention.

FIG. 12 illustrates embodiments of a mixed code that is a combination of a color code image and a QR code image according to the present invention. The color code image is made using colors and shading, and the QR code image is a black-and-white image. Thus, the color code and the QR code may be combined by coloring the QR code based on the color code, such that a white part of the QR code is brighter than a black part thereof or the black part of the QR code is colored without changing the white part (of course, the opposite is possible).

When using a pattern such as a logo or a trademark, the color and brightness of the pattern must be determined in consideration of those of an image to be used with the pattern.

For instance, it is not desirable that a black pattern overlaps with the QR code, the color and brightness of which are identical to those of the black pattern or a white pattern overlaps with the QR code, which leads to damage to the image.

8. Combination of Basic Code Image and Additional Information Image

The two images, the difference in color and brightness of which is computed, are combined. In this case, the two images are combined to be exactly mapped to each other, based on the construction information of the control information. The result of combining the two images may be used as a digitalized file, displayed on a display unit, or printed onto a physical medium.

Figure 13:
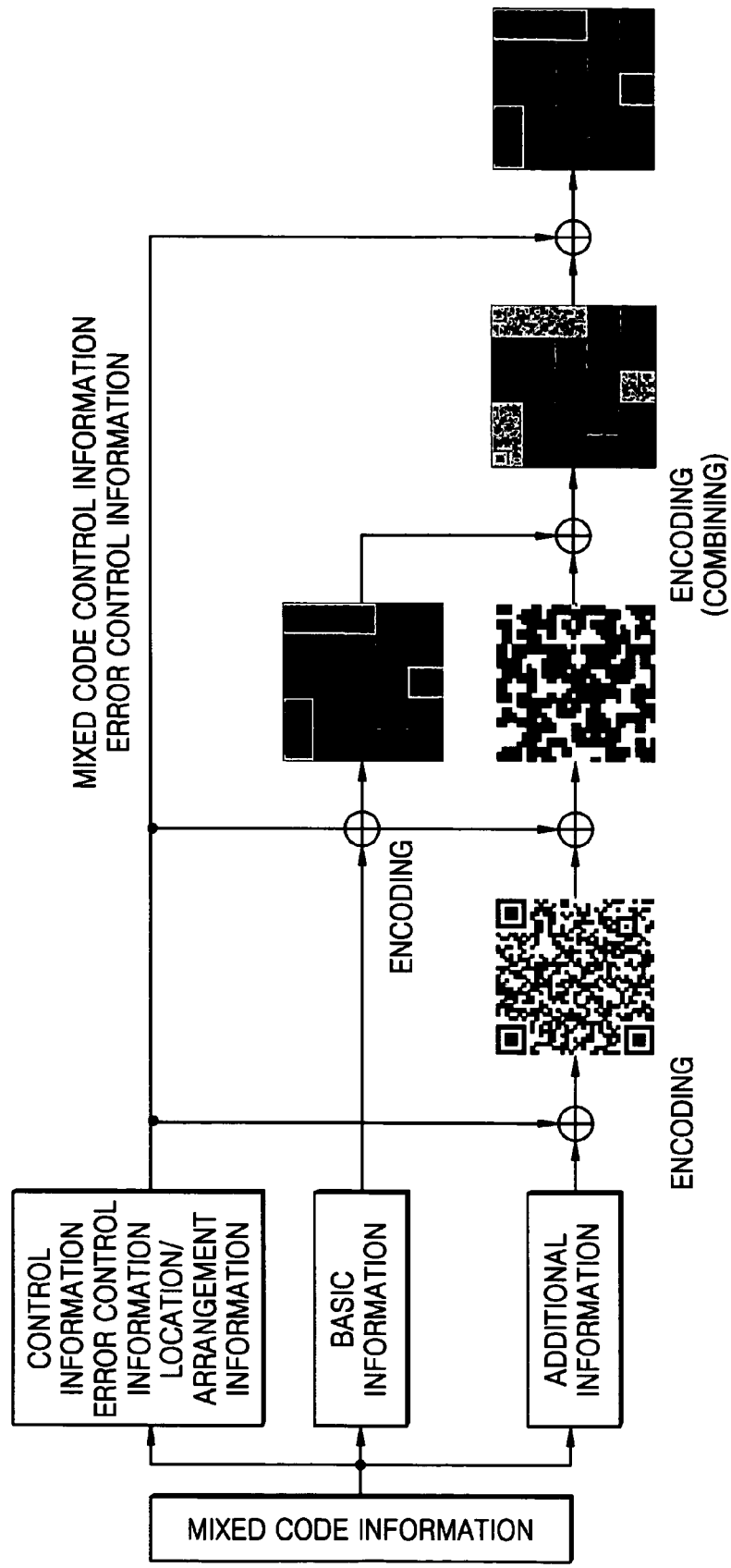
FIG. 13 illustrates a process of making a mixed code by combining a color code image and a QR code image according to an embodiment of the present invention.

FIG. 13 is illustrates a process of generating a mixed code by combining a color code image and a QR code image according to an embodiment of the present invention. Referring to FIG. 14, information regarding the mixed code is divided into basic information and additional information, and control information required to transform the basic information and the additional information to a basic code image and an additional information image, respectively, is set. Next, the basic information and the control information are encoded into colors to obtain the basic code image, and the additional information and the control information are encoded to a QR code to obtain the additional information image. Then, the difference in color and brightness between the basic code image and the additional information image are determined and the basic code image and the additional information image are combined to make the mixed code.

Figure 14A:
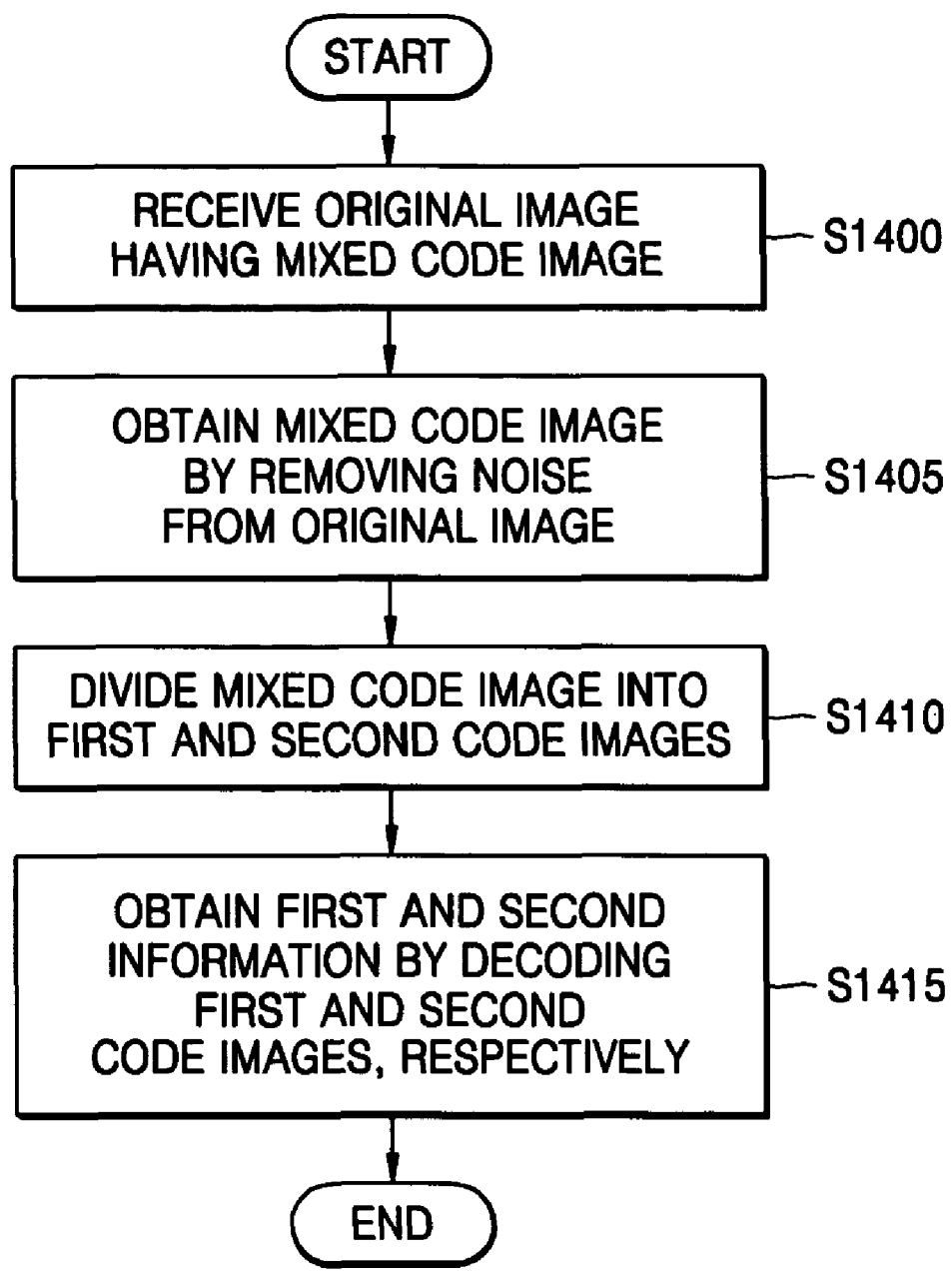
FIGS. 14A is a flowchart illustrating a method of decoding a mixed code according to an embodiment of the present invention.

FIG. 14A is a flowchart illustrating a method of decoding a mixed code according to an embodiment of the present invention. Referring to FIG. 14A, the original image that includes a mixed code image obtained by overlapping a first code image with a second code image, is received (S1400). The original image is received in digital data format in a scanner, a camera, or online.

Next, the mixed code image is obtained by canceling noise in the original image (S1450). More specifically, image distortion in color or brightness, which is caused by physical ambient conditions under which the original image was received, is compensated for, and a binary image is obtained by dividing the color or brightness of the compensated image into two colors based on a predetermined reference value.

Next, a region connected to the edge of the binary image is considered as noise and canceled. The binary image is divided into predetermined block units, and a block with the greatest number of pixels is detected. Then, maximum and minimum values of the binary image in the upper, lower, left, and right directions are measured from the center of the detected block to the outside thereof or from the outside to the center. Then, a limited rectangle with vertexes having measured four locations values is obtained, a mixed code image region is derived in the limited rectangle, and the mixed code image is obtained by corresponding the mixed code image region to the original image.

After obtaining the mixed code image (S1405), the color, shading, and brightness of each pixel of the mixed code image are analyzed, and the analyzed color shading, and brightness are grouped based on a predetermined threshold. Thereafter, a first code image and a second code image are separated from the mixed code image based on the normalized color, shading, and brightness (S1410).

Next, the first and second code images are decoded to extract first and second information, respectively (S1415).

Figure 14B:
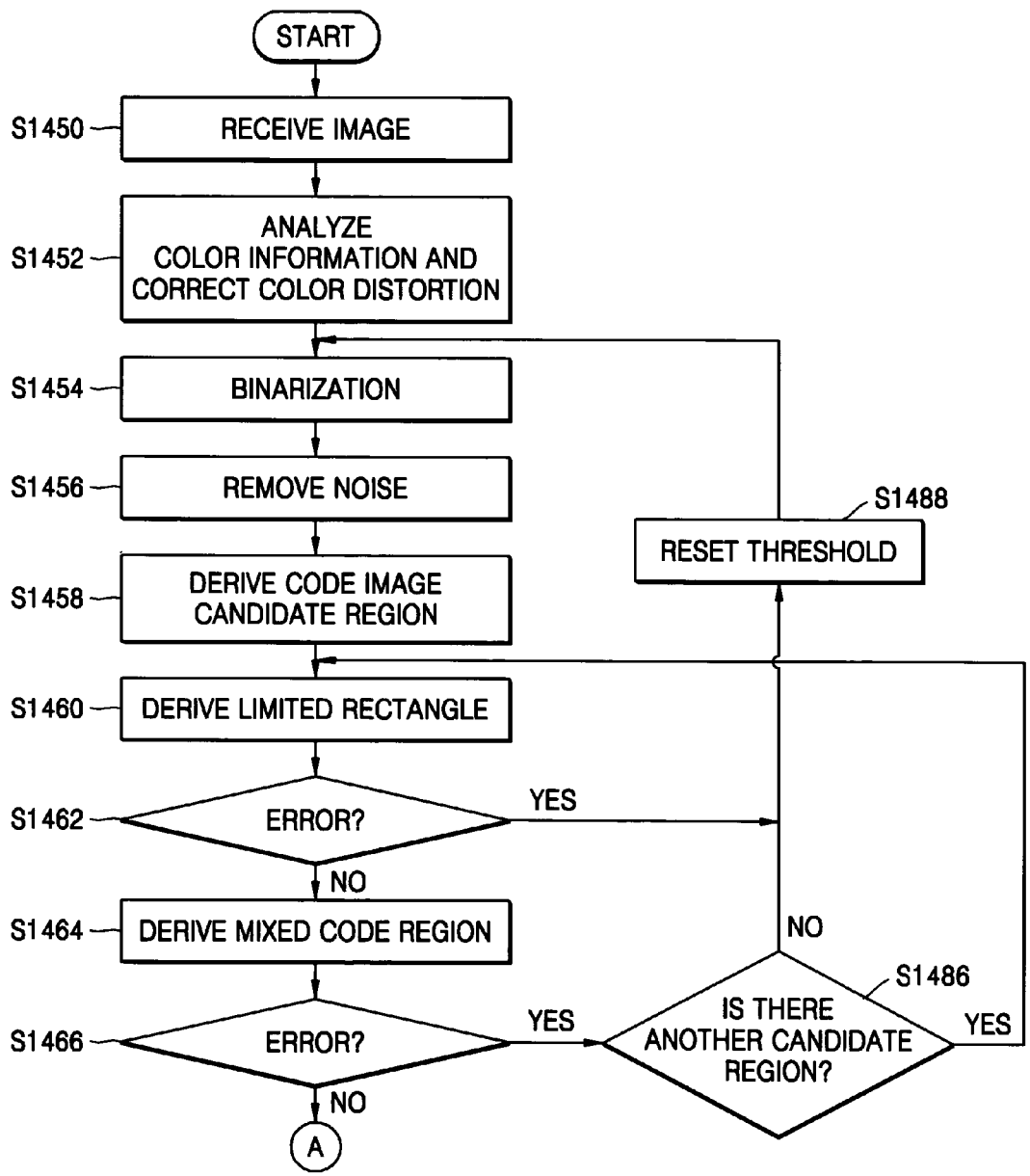

FIGS. 14B and 14C illustrate a method of decoding a mixed code according to an embodiment of the present invention. Operations of the method illustrated in FIGS. 14B and 14C will now be described in greater detail.

1. Input of Image, and Analysis of and Compensation for Color Information (S1450 and S1452)

In operation S1450, an image with a mixed code is received from a scanner or a camera or digital data is read out from a computer. In operation 1452, the read image is analyzed to remove color distortion thereof, caused by use of an illuminator. Unlike an image produced by a computer, the image input from the scanner or the camera would experience color distortion caused by ambient conditions or the characteristics of a tool used. Color distortion occurs depending on the degree or color of light emitted from an illuminator (a halogen lamp, a natrium lamp, an incandescent lamp, and so on), the color temperature of an image inputting apparatus, white balancing, the resolution of a printing apparatus, and an image model RGB or YUV.

The characteristics of a physical medium printed with the mixed code are major factors that cause color distortion. For instance, color distortion may be caused due to the color of paper or a medium printed with the mixed code (e.g., a pink newspaper), the resolution of the paper or the medium (newspaper: 751 pi, and a general type of paper: 300 dpi), or the color of or light reflected from the paper or the medium that is coated.

Color distortion sometimes prevents a color from being exactly recognized, and as a worst scenario, it causes the color to be recognized as a wrong color. For instance, a halogen lamp, which is a red-based illuminator, places emphasis on a red color value R of the RGB channels, and thus, green may be recognized as red.

When a reproduced image of the original image appears to have a higher amount of a specific color compared to the distribution of all colors of the original image, the colors of the reproduced image are preferably adjusted by performing an arithmetic operation on RGB values of each pixel thereof. A gray world assumption (GWA) technique is a representative way of adjusting colors of an image. The GWA technique is based on an assumption that the averages of the respective RGB values of all pixels of an image, which is captured under general ambient conditions, approximate to a predetermined value, i.e., a gray color value. In general, the GWA technique is used to process a large image that contains various types of elements, captured under general ambient conditions. However, it is applicable to a code recognition application that uses general colors and brightness, since the mixed code is likely to be included in an image with general elements and a surplus margin.

In other words, using the GWA technique, the RGB values of each pixel of the original image are measured, the averages of the RGB values are computed, respectively, the similarity among the three mean values is computed, and the difference between the value of a specific channel and a predetermined threshold is compensated for.

$$M(i)=M(i)-(E(i)-WE(G)) \text{ where } i|E(i)>WE(G), i \in R, G, B \quad (1),$$

wherein M(i) denotes an i-channel of whole image; E(i) denotes a mean value of i-channel values of a whole image; E(G) denotes the mean value of brightness values of the whole image, which is computed by M(R)+M(G)+M(B)/3; and W denotes a weight.

In Equation (1), a subtraction operation is used to compensate for a color value, but variozus operations such as an addition operation, an exponential operation, and a log operation may be used. In addition, a gamut mapping or a correlation method may be used for compensation for a color value, in particularly, when camera characteristic information is given.

2. Binarization (S1454)

In operation S1454, the image input from the scanner or the camera, or the digital image thereof is transformed into a black-and-white image. In general, a color image is transformed into a black-and-white image using a threshold which is a specific value in the field of image processing, since the amount of computation of a black-and-white image is less than that of a color image and the black-and-white image can be more easily processed than the color image. The original image is stored in a separate region. For convenience, binarization has been described as an operation in which the read image is transformed into a black-and-white image. However, binarization may be performed such that the read image is transformed into other two different colors.

If necessary, several thresholds to be used when the result of transformation is not satisfactory are set, thereby improving the result of transformation. Otherwise, the threshold may be determined by computing brightness values of the whole image, computing an average value or a mean value of the brightness values or analyzing a value of brightness distribution of image, dividing pixels into groups having similar brightness values, and computing an average of the similar brightness values of the groups.

Whether the result of transformation is satisfactory is determined in subsequent operations in which a limited rectangle of the mixed code and a code region are derived, respectively, which will later be described.

$$P(x,y)=1, \text{ where } P(x,y)<T\ 0, \text{ Otherwise} \qquad (2),$$

wherein P(x,y) denotes the brightness value of pixel coordinates (x,y), and T denotes the threshold.

3. Cancellation of Noise (S1456)

In this operation, noise is canceled from a binarized image. In general, noise is canceled by using length-based filtering, masking, or the relationship between the noise and the edge of an input image and noise.

Noise, which represents unnecessary elements of an image and is contained in a low-quality binary image in genera, is canceled in this operation. In the length-based filtering, noise is removed by canceling a pixel with a specific brightness value by performing an operation on pixels to the left, right, top, and bottom of the pixel when the value of the pixel is less than a predetermined reference value.

In the masking, noise smaller than a specific size is canceled by masking each pixel of a block image of a specific size. Canceling noise by using the property of an edge portion of an input image is based on a fact that in general, a code image includes a quite zone (a surplus space around a code).

In general, a code includes a white surplus space, which separates a code image from background color or the surroundings (characters, colors, or the like), to protect the code image. Therefore, cancellation of noise connected to the edge portion of the input image draws an effect of removing only the noise from the image, since the edge portion is not associated with the code image.

Noise that is not connected to the edge of the input image are preferably removed by using size-based filtering or length-based filtering. In size-based filtering and length-based filtering, the size and length of a pixel are preferably less than those of a minimum unit of element images constituting the mixed code. Otherwise, the mixed code image may be damaged.

$$f_{noise}(O_{xy})=0, \text{ where Size}(O_{xy})<D \text{ (white) 1, Otherwise (black)} \qquad (3),$$

wherein $f_{noise}(\ )$ denotes a noise cancellation function, $O_{xy}$ denotes an object image with coordinates (x,y), Size($O_{xy}$) denotes the size of the object image with coordinates (x,y), and D denotes a threshold size or a threshold length.

4. Derivation of Candidate Region of Code Image (S1458)

Blocking is an operation which is first performed to detect a region including the mixed code from the input image. In blocking, the input image is divided into block units, the size of a black image selected from binarized images is computed, and a block with a largest image is detected based on the size of the black image.

In general, since a relative or absolute minimum size of the code image to be decoded has been determined, the size of the block is adjusted to the minimum size, and a total number of black pixels in each block is computed to detect a block having a largest number of black pixels. The center of the block having the largest number of black pixels is very likely to be located inside the code image. Accordingly, it is possible to easily determine the location of the code image through blocking.

In the case where the total number of black pixels in the blocks are almost the same, the connection between images included in the blocks is detected to determine whether they form a whole image. If not, it is highly probable that the input image includes a plurality of code images. In this case, the images in the blocks may be determined as code image regions and separately processed. Also, the code image is likely to be located around the center of the input image. In this case, even if the code image is small, it can first be processed by applying a weight to a central block if required.

$$i=\max(i|\text{sum}(P_i(x,y))), i=0, 1, \ldots, B-1 \qquad (4),$$

$P_i(x,y)$ denotes a pointing value (0 or 1) of an $i^{th}$ block, and B denotes a maximum number of blocks.

5. Derivation of Limited Rectangle (S1450, S1462, S1464, S1486, S1488)

The limited rectangle, which is a rectangle enclosing the mixed code image, is derived by determining four vertexes of the limited rectangle, using the location of the mixed code that is detected using blocking, and maximum and minimum location values of an image forming the mixed code (S1460). That is, the limited rectangle is derived by setting a point in the mixed code image, which is detected by blocking, to a central point and using the maximum and minimum location values of an image that includes the point. The mixed code region is derived from the limited rectangle (S1464).

If the inside of the mixed code image is entirely colored, the connection between the central point and the inside of the mixed code may be determined to detect the maximum and minimum location values. Alternatively, a virtual rectangle enclosing the mixed code image may be detected from the outside of the mixed code image to the central point in upper, lower, left, and right directions.

In the case of the mixed code image that has a pattern shape or an open shape, when the distances between elements of the mixed code image are less than a threshold, the mixed code is considered as being included in one image and the limited rectangle is derived from the mixed code image.

FIG. 15 illustrates results of binarizing a mixed code image and searching for a limited rectangle according to an embodiment of the present invention. FIG. 15A illustrates a mixed code image, the inside of which is completely colored, and FIGS. 15B and C illustrate mixed code images, the insides of which are incompletely colored. FIGS. 15A through C are obtained by binarizing the mixed code image based on an assumption that when the distance between elements of the mixed code is less than a threshold, the elements are connected to each other.

Whether the mixed code image can be detected using the shape of the limited rectangle in operation S1460 is determined (S1462). When the limited rectangle distorts extremely, for example, it is a trapezoid, it is determined that an error occurs during a binarization process or a noise cancellation process. In this case, a new limited rectangle is preferably derived again after the threshold is readjusted through binarization (S1488). Also, when another candidate block is detected during blocking, a new limited rectangle may be detected using the detected limited rectangle.

6. Derivation of Mixed Code Region (S1464, S1466, and S1486)

In operation S1464, the mixed code image is detected from the limited rectangle. The limited rectangle may include not only the mixed code image but also noise enclosing the mixed code image, and thus, the mixed code must be exactly detected from the limited rectangle. In general, the mixed code image is detected by detecting a borderline determining the limits of the mixed code image, or a code sensing pattern.

If the mixed code is clogged, e.g., the color code, it is possible to detect it by extracting characteristic points of an outer portion of the mixed code image or the borderline of the mixed code image.

For instance, the vertexes of the mixed code image are detected using the limited rectangle and points of images in the limited rectangle, which contact the limited rectangle. Also, the mixed code image can be detected by determining whether each image is continuous while following its outer lines from the points to separate the mixed code image from noises, and selecting a largest image as the mixed code image from the images. In general, the outer line of the code image may be detected using an edge detecting method using an Laplacian filter or a Sobel filter or a turtle algorithm.

However, in the case of a 2D code or a barcode that has a pattern shape and thus is difficult to detect the overall borderline thereof, the mixed code image can be derived by detecting a code sensing pattern or starting and ending patterns, and detecting all code sending patterns. Detecting of the patterns is limited within the limited rectangle, and thus, it is possible to easily detect the mixed code image.

Like the limited rectangle, it is possible to determine whether the mixed code image region is appropriately extracted from the limited rectangle (S1466). If the extracted mixed code image distorts extremely, binarization is performed again to reset the threshold and then the mixed code image is extracted again (S1488). If another candidate block is detected during blocking, it is possible to detect the limited rectangle again using the candidate block (S1486).

7. Analysis of Image Characteristics (S1468)

When the mixed code image is derived, it is possible to acquire information regarding the locations of the characteristic points or starting and ending regions of the mixed code image, and the borderline of the mixed code. For instance, when the derived mixed code image is a rectangle, information regarding four vertexes thereof is obtained. If the mixed code image is a pattern, information regarding characteristic points of each location detecting pattern is obtained. If the mixed code image is a circle or an oval, information regarding a region inside the borderline is obtained. Based on the obtained information, characteristics of images in the mixed code image are analyzed.

The characteristics of the images are analyzed mainly by measuring the distributions of colors and brightness, using information regarding the original color image corresponding to mixed code image, which is obtained through binarization. The image characteristics are analyzed to separate a basic code image and an additional information image, which constitute the mixed code image, from each other, since in general, they are combined based on the difference in color or brightness between them.

In general, the basic image and the additional image are differentiated from each other using colors, and not by using colors. When using colors, one of the two images is represented based on color information, and the other is represented using different color or shading. When not using colors, they are differentiated from each other using the brightness difference between them.

In general, the color information is first analyzed by collecting information regarding image pixels in the mixed code image. Whether the mixed code image uses the color information is determined according to the result of analysis, and the distribution of colors is computed using a RGB channel when it is determined that the mixed code image uses the color information.

Whether the mixed code image uses the color information may be determined by computing a brightness value of each pixel and comparing the brightness value with each of the values of RGB channels of the pixel. When the value of a specific channel is less or greater than a threshold, it is determined that the mixed code image uses a color corresponding to the specific channel. Otherwise, whether the mixed code image uses the color information may be determined by computing the relationship between RGB channels. That is, when the difference among the RGB channel values is greater than a threshold or a threshold rate, it is determined that the mixed code image uses the color information. If the basic code image and the additional information image are differentiated from each other using only brightness difference, it means that they are represented with an achromatic color, and thus, the RGB channel values of each pixel are similar. When it is determined that the basic code image and the additional information image use the color information, the color distribution is analyzed to compute the type, distribution region, or characteristics of the color.

When the basic image and the additional image are differentiated from each other using brightness difference, it is also possible to compute the type, number, and distribution characteristics of brightness information by computing the brightness distribution of pixels in the mixed code image. For instance, when a lot of white pixels are distributed throughout the mixed code image, the mixed code image is considered as having the mixed code, such as a 1 D barcode or a 2D white-and-black code, which mainly uses a pattern, a trademark, or a logo. When the mixed code image includes a small number of white pixels or no white pixels, the mixed code image is considered as having a code, such as a color code or a gray code, which is mainly represented as a region type (which processes a code region using colors or shading), not a pattern type image. In this case, such image characteristic information is obtained to be used as basic information for later decoding.

8. Setting of Threshold and Grouping (S1470)

In operation 1470, reference values to be used in separating the basic code image and the additional information image from the mixed code image are determined, using image information regarding the mixed code image which is obtained through analysis of image characteristics.

When colors are used to distinguish the basic code image from the additional information image, the distribution of colors and the relationship between color channels are measured and the result of measurement is determined as a reference value to be used in determining colors. For instance, when one of RGB channel values or a combination thereof is greater than a threshold, a pixel with the RGB channel values is considered as having a predetermined color. Accordingly, absolute values, a reference ratio, or a combination of the RGB channels of each pixel, which can be determined as reference color values, may be determined as reference values.

For instance, when a color model is an RGB model, it is possible to set a set of RGB values, which are to be used in determining each color, as reference values. When the color mode is a HSV(HSB) model, it is possible to set a relative value or an angle value representation of hue, saturation, and brightness as the reference values. For instance, when using the HSV model, a hue value of a pixel located between 60° and 180° is green, that of a pixel located between 180° and 300° is blue, and that of a pixel located at one of the other angles is red. In this case, 60°, 180°, and 300° are used as thresholds.

$$P(i) = G \text{ where } Tg1 <= HSV(p(i)) < Tg2$$
$$= B \text{ where } Tb1 <= HSV(p(i)) < Tb2$$
$$= R \text{ where otherwise,}$$
(5)

wherein Tk denotes a $k^{th}$ color threshold.

For brightness information, thresholds must also be estimated to be used as reference values in categorizing images mainly into white, black, and gray images. Since gray may be divided into a plurality of levels, a plurality of thresholds corresponding to the plurality of levels may be determined.

In general, brightness values of the mixed code image are analyzed through a histogram technique, and a threshold is determined by using a dense area and a spare area of pixels of a specific brightness value. That is, dense areas of the pixels with the specific brightness value are categorized into groups, and brightness values used to categorize the groups are set as thresholds.

The basic code image and the additional information image constituting the mixed code image may be distinguished from each other, using a combination of a color and a color, a color and brightness, or brightness and brightness. When using colors, it is preferable that the color of each pixel of the mixed code region is compared with a reference color using a color threshold and the colors are divided into several groups according to the connection or the threshold distance between the pixels. When the colors are grouped, virtual cells are obtained.

That is, although being different in shading or brightness levels, pixels whose colors are determined to be the same are adjacent to each other, are considered as belonging to the same group. If a code is obtained by coloring a pattern and thus the distance between pixels is large, cells are obtained by computing the distance, virtually filling the distance with the same color when the distance is less than a threshold, and categorizing the pixels into groups.

Similarly, it is possible to transform the mixed code image into cells, using thresholds for the brightness information. However, in the case of brightness information, there are a lot of points to be considered. One of the points is that when used together with a color, brightness may be represented while changing the shade of the color. For instance, when a pattern type code such as the QR code is added onto the color code, each pixel of the QR code may be represented with the color that is equal to that of a color cell to overlap with the pixel but is darker or lighter than the color of the color cell.

In this case, all cells of the QR code may do not have the same brightness value. Accordingly, a threshold must be obtained by computing the difference in brightness/shade between regions of a cell, which are divided using a color threshold. Also, the regions of the cell must be divided into groups according to the brightness and shade of each color, using the threshold. For instance, it is possible to extract darker portions from each color cell region and pattern the extracted portions.

Of course, a figure, an image, a symbol, or a character can be added to a code image represented using a color or gray, the figure, the image, the symbol, or the character having the same brightness value as the code image. In this case, it is possible to separate the figure, the image, the symbol, or the character from the code image only by extracting a threshold for only brightness information.

9. Separation of Basic Code Image and Additional Information Image (S1472)

When the mixed code image is divided into groups using color and brightness thresholds, image separation is performed based on the groups, and image grouping is performed according to image elements. When using colors, it is preferable that image separation is performed using color distortion, and then, image separation is performed using brightness difference.

When using colors, it is possible to extract cells or patterns that are determined to have the same color, using a color threshold, and categorize the extracted cells or patterns into groups according to color. Similarly, when using brightness, it is possible to extract patterns or cells using an absolute value or a relative difference and categorize them into groups.

For image grouping, criteria and method therefor are preferably predetermined in a program. For instance, a mixed code image using color and brightness information is set to be grouped into images constructed according to color information and images constructed according to brightness information. Then, information regarding colors determined by a color threshold may be collected and grouped to form an image, and information regarding relative brightness differences in the resultant color cell may be groped to form another image, thereby obtaining a mixed code including the color code and the QR code, for example. That is, a white region and a black region of a color code including color cells are mapped to a lighter color and a darker color, respectively.

Alternatively, images with lighter pixels, and images with darker pixels may be grouped into two images. A portion that the two images overlap each other may be separately represented using a different brightness level or a different color. For instance, when the QR code and the barcode, which are printed with black and white in general, are combined, they are mapped to different brightness levels.

Of course, when the QR code and the barcode have different colors, it is possible to more easily differentiate them from each other. For instance, the QR code is mapped to red, the barcode is mapped to blue, and a portion the QR code and the barcode overlaps with each other is mapped to purple. If the mixed code is comprised of such the QR code and the barcode, it is possible to more easily separate images from the mixed code image.

The grouped images are divided into the basic code image and the additional information image. Determining whether one of the grouped images is used as the basic code image or the additional information image will later be described.

10. Extraction of Code Direction/Arrangement Information, and Image Source Information (S1474)

First, code direction information must be obtained to extract information from the separated two images. The code direction information specifies an angle of rotation that is the difference between the original angle of the code image and an angle of the code image that is rotated. It is impossible to extract code information according to a normal order without the angle of the code image According to the preset invention, the code information is extracted from the two images separated from the mixed code image. A method of extracting the code information is selected according to image characteristics. For instance, when an image is a code image, a predetermined pattern or location information indicating the direction of the code is included in the image.

FIG. 16 illustrates a mixed code image with code direction and arrangement information according to embodiments of the present invention. In the case of a 1D barcode illustrated in (c) of FIG. 16, a PDF-417 code, or an ultra code, it is possible to obtain code direction information by detecting starting and ending patterns. In the case of a 2D code, particularly, a QR code illustrated in (b) of FIG. 16, it is possible to obtain code direction information based on a relative location of a detected predetermined location detecting pattern. When using colors, as illustrated in (a) of FIG. 16, code direction and arrangement information may be arranged in a predetermined sequence of colors or represented using a combination of parity information as in the color code or the gray code.

The directions of pixels of a mark, a trademark, a character, or a photograph can be detected using information regarding their characteristic points, line types, and directions. However, since it is difficult to compute the information beforehand and a large amount of computation is required, it is preferable that a location pattern of such an image is added to or this image is set as an additional image when encoding the image so that direction information can be detected using a basic code image.

Arrangement information is information based on which a specific position in a code image is indicated or decoding is performed. In general, the barcode or the 2D code includes specific arrangement patterns as reference patterns to be used in decoding. The specific arrangement patterns may be a center separation pattern of the barcode, or arrangement patterns arranged on and a left outer side of a data matrix. The color code or the gray code does not require the arrangement patterns since a related program provides information that they are divided into a specific number of matrices. However, arrangement information is required when cells are divided by a border line or a border region is provided.

In general, code direction information is related to position detection information. A direction information pattern may be included as a subset in an arrangement pattern, or the arrangement pattern may be identical to the direction information pattern. In the case of the color code and the gray code made in units of regions, not patterns, a direction detection cell can be detected using parity information regarding each cell, and arrangement information specifies a borderline between the cells or a predetermined division ratio.

In the case of a region type code, since color information of every cell must be obtained to detect the direction detection information, source information values of the code are computed and then the direction detection region is detected. Thereafter, the source information values are rearranged according to the code direction.

The source information is obtained by extracting information from all obtained images in minimum units. The extracted information may be transformed into a number, a character, a sign, a symbol, and/or a color value according to a predetermined transform table.

In the color code, a color value of each cell divided from an image is expressed with numbers and characters, obtained according to a predetermined transform table. In a black-and-white barcode or the QR code, black and white patterns are divided into predetermined module units and represented with a series of 0's and 1's. The sizes of such minimum units may vary according to the arrangement pattern. That is, the size of a minimum unit such as a set of cells or patterns is determined by the size and position of the arrangement pattern or predetermined instructions in a program.

For instance, it is possible to determine a total number of matrix type modules constituting the QR code by computing the sizes of location detection patterns and a ratio of distances between the patterns. In the case of the color code, cell size is determined using a borderline and a code region is divided into units of cells. When not using the borderline, cell size is determined and a code region is divided in units of cells, based on that a program instruction that a code that has a regular tetragon shape is 5×5 and a code that has a right-angled tetragon shape is 8×5. Likewise, a sign, a trademark, a pixel, or an image, information regarding the location of which is difficult to be obtained, may be divided into module units and an operation may be performed on each module unit.

However, it is not required to derive the source information and direction and location information from both the two images separated, since construction information of the image whose source information and direction and location information are not derived can be obtained using control information which is to be obtained in a subsequent process. Basically, a code image containing location and arrangement information may be either a basic code image or an additional information image. If both the basic code image and the additional information image include the location and arrangement information, the types of the basic code image and the additional information image are predetermined in a program, or a code image including control information is detected and one of the separated two images is determined as the basic code image using the detected code image.

11. Error Control of Derived Code Image (S1476 and S1478)

In operation S1476, whether each image includes an error is checked and an error, if any, is corrected based on the obtained source information. When the source information is extracted from only one of the two images according to the direction and arrangement information, this error is corrected. If the parity operation is used, it is possible to easily detect an image containing an error using the parity operation. If it is determined in operation S1478 that the mixed code does not include information for error correction, the thresholds are reset in operation S1454 or S1470 and error checking and correction are performed again. If the mixed code includes error correction information, the error can be corrected using the error correction information.

When the source information is extracted from both the two images, it is possible to detect and/or correct an error from both the two images using error control information. When one of the two images has an error, operations 1470 through 1478 may be performed again on only the image with the error. In the case of a region type code, since the parity operation is performed thereon before operations S1476 and S1478, the result of operation is considered.

12. Derivation of Control Information and Image Decoding (S1480)

In operation S1480, the obtained source information is divided into predetermined units of regions to obtain an information region and a control information region. Since the code direction information, the arrangement information region, and the error control region were obtained in the foregoing operations, the information region and the control information region can be easily obtained. If the source information is obtained from only one of the two images, the control information is derived to obtain the construction information of the other image and information regarding the relationship between the two images. The result of encoding the control information is preferably included in the image region, but when the relationship between the basic information and the additional information is set via a program, information regarding the relationship is used as the control information as described in 2.1 regarding operation S1100.

(1) Derivation of Construction Information of Mixed Code

The construction of the mixed code is determined to extract the basic information and the additional information from the source information on which error checking and correction is performed based on the error control information. The construction information regarding each image is obtained based on the derived control information. If both the two images include the control information, it is possible to determine the constructions of both the two images from the control information.

However, when the control information can be extracted from one of the two images, it is possible to determine the construction information regarding only the other image based on the extracted control information. The construction information may specify the type of the basic code image, a total number, positions, and types of additional information element images, directions of the additional information element images that are arranged, a total number of sub-basic information images, and an encryption method used.

(2) Image Decoding Based on Construction Information

Since the construction information specifies the arrangement and positions of the additional information element images, each additional information element image is divided into predetermined units based on the construction information and decoded according to the type thereof. For decoding, each additional information element image is adjusted to its original position based on the information regarding the directions of the additional information element images arranged, and recovered to its original state according to a predetermined algorithm using the information regarding the encryption method.

A key value for decoding may be set in the control information or designated in a decoding program. Otherwise, when a program requires a key value to determine whether a user is an authorized user, the key value may be given from the user.

Next, decoding is performed on a predetermined region of each additional information element image based on the information regarding the types and positions of the additional information element images. In detail, decoding is performed by detecting an arrangement pattern, dividing each additional information element image into module units, extracting a source code, and extracting error correction information. A process that is not indicated in the control information may be skipped. The shape of data in each information region obtained by decoding may vary depending on the types of the additional information element images, specified in the control information region.

For instance, when the additional information element image is a general code image, code information values are derived as a character, a number, a sign, and so on. When the additional information element image includes a character, a mark, or a trademark, code information values are derived as predetermined values, such as an 8-direction chain code, a shape number, or a Fourier descriptor, through pattern matching. The 8-direction chain code, the shape number, and the Fourier descriptor are represented with information regarding corresponding numbers, characters, signs, symbols, or marks. To obtain such information, pattern information may be obtained by additionally processing each additional information element image using a conventional image processing technique, such as thinning, filtering, or planarizing, so that pattern information can be easily obtained; detecting connection points or characteristic points of obtained segments; and producing the pattern information based on the result of detection. Further, a luminosity value or a color value of each pixel of a photograph image may be represented using a brightness value or a set of RGB channel values.

13. Derivation of Mixed Code Information Based on Interpretation Information (S1482)

After deriving the information regions from the two images based on the construction information included in the control information, the basic information and the additional information are extracted from the derived information regions in operation S1482. Based on the control information set in the code or a program, each information region was made by combining the basic information and the additional information and normalizing the result of combining.

Operation S1482 is performed using the interpretation information included in the control information of the mixed code. First, information that is obtained from each information region and has yet to be normalized is rearranged in the original state by performing inverse transform, which is one of encoding techniques, thereon based on the information regarding manner of information arrangement, stored in the control region. Information regarding the basic information and the additional information are represented in predetermined information formats. The information formats may be specified in a predetermined transform table in a program. Thus, two pieces of information are obtained.

One of the two pieces of the information is used as the basic information and the other is used as the additional information. As described above, a policy that determines which one of the two pieces of the information will be encoded into a basic code image, must be mapped in the control information region or programmatically predetermined. The policy may be specified either in the relationship information of the control information or the construction information.

The two pieces of the information are checked and an operation is performed thereon, based on the relationship information in the control information, thereby producing the original mixed code information. The mixed code information is obtained as a piece of information, or separate pieces of information if required.

For instance, when the basic information is identical to the additional information, a code that can be easily or exactly recognized is derived from one of them. This is the same when the basic information and the additional information are related to each other. However, when each of them includes the other, both code information of a base set and code information of a subset must be obtained. When the additional information image is a photograph, it is derived as a visual image, and information regarding a basic code used together with this image is separately provided. As described above, such information is represented using a character, a number, a sign, a figure, an image, or a trademark.

14. Provision of Service (S1484)

The obtained mixed code information can provide a variety of services according to the control information or service information set in a program. For instance, if the mixed code information specifies individual identification and includes photograph information, it can be used to provide a service such as a passport authentication interface or a photo business card interface. Likewise, when the mixed code information includes the basic information and the additional information that are related to each other, it is applicable to physical distribution and inventory control.

Figure 17:
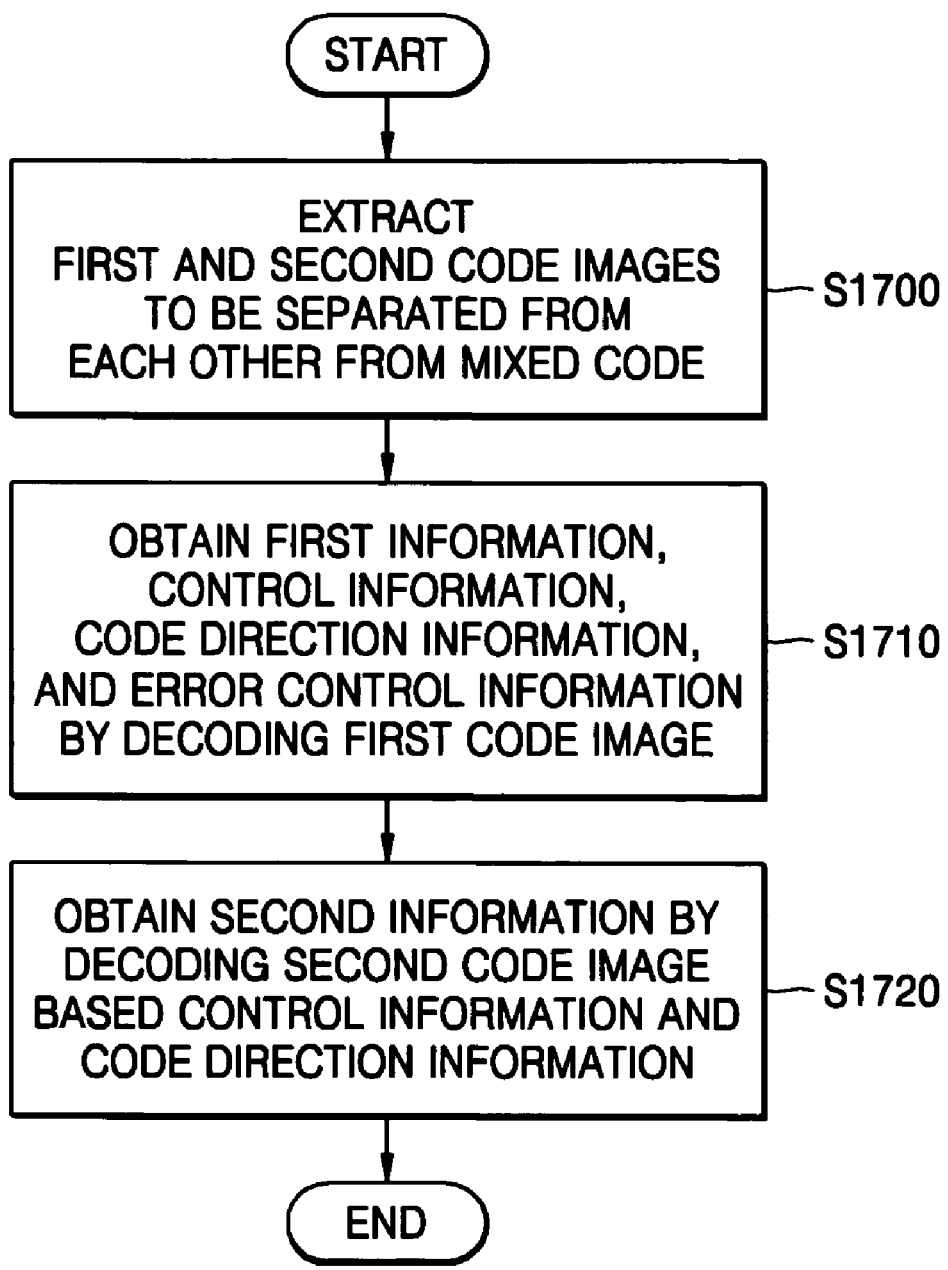
FIG. 17 is a flowchart illustrating a method of decoding a mixed code according to another embodiment of the present invention.

FIG. 17 is a flowchart illustrating a method of decoding a mixed code according to another embodiment of the present invention. Referring to FIG. 17, a first code image and a second code image are extracted from the mixed code based on the difference in color and brightness between the first and second code images, such that the first and second code images are separated from each other, the mixed code image being made by overlapping the first and second code images with each other (S1700). A method of extracting the first and second code images from the mixed code has been described above with reference to FIGS. 14A and 14B.

Next, a data region and a control information region of the extracted first code image are decoded to obtain first information and construction information that specifies a manner in which the second code image is located on the first code image (S1710).

In detail, as explained above with reference to Table 1, the construction information specifies a total number of sub-regions obtained by dividing the first code image into equal parts, a total number of element images constituting the second code image, positions of the centers of the element images on the sub-regions, the code types of the element images, a method of encrypting each element image, and a direction in which each element image is arranged.

Next, second information is obtained by decoding the second code image based on the obtained construction image (S1720). The first code image may further include a control information region (interpretation information region) in which information regarding the relationship between the first and second information is encoded. In this case, the relationship information is acquired by decoding the interpretation information region of the first code image, and information to be expressed using the mixed code is acquired by applying the relationship to the first and second information.

Here, as illustrated in FIG. 9, the relationship may be defined as an equal relation, a linking relation, an additional relation, a subset relation, and an arithmetic relation. The information to be expressed using the mixed code is obtained from the first and second information according to the relationship therebetween.

The control information region may further specify the formats and arrangement of information included in the first and second code images, and further control of code.

The first code image may further include a code direction information region and an error control information region. Image decoding can be easily performed by obtaining code direction information by decoding the code direction information region, and determining the directions of the codes in the first and second code images based on the obtained information.

When error control information is obtained by decoding the error control information region of the first code image, an error in the first and second information is detected and corrected based on the error control information. The interpretation information region, the control information region, and the error control information region may be included in both the first and second code images.

Figure 18:
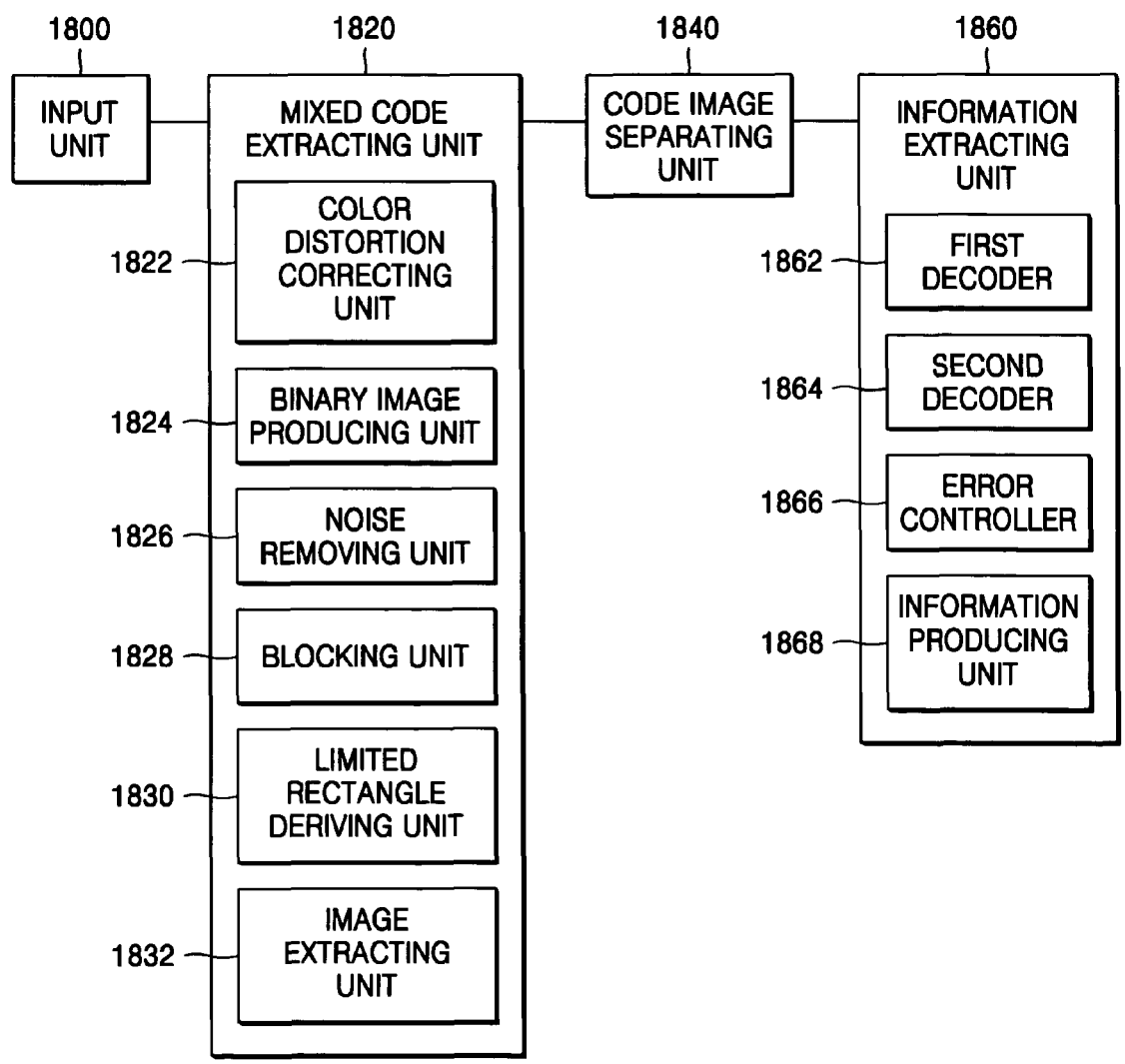
FIG. 18 is a block diagram of an apparatus for decoding a mixed code according to an embodiment of the present invention.

FIG. 18 is a block diagram of an apparatus for decoding a mixed code according to an embodiment of the present invention. Referring to FIG. 18, the apparatus includes an input unit 1800, a mixed code extracting unit 1820, a code image separating unit 1840, and an information extracting unit 1860.

The input unit 1800 receives the original image with a mixed code image from a scanner or a camera, or in the form of an electronic document format, the mixed code image made by overlapping a first code image with a second code image.

The mixed code extracting unit 1820 removes noise from the original image to obtain the mixed code image. In detail, the mixed code extracting unit 1820 includes a color distortion correcting unit 1822, a binary image generating unit 1824, a noise removing unit 1826, a blocking unit 1828, a limited rectangle deriving unit 1830, and an image extracting unit 1832.

The color distortion correcting unit 1822 corrects distortion of color and shade of the original image, caused by ambient conditions (brightness and color of light, the quality of a medium storing the original image, and so on) under which the original image was received. The binary image generating unit 1824 generates a binary image by dividing the corrected color or shade of the original image into two colors based on a predetermined reference value. It is preferable that the binary image be generated by transforming the corrected color or shade into black and white so as to reduce the amount of calculation.

The noise removing unit 1826 determines and removes a region contacting the edge of the binary image. The blocking unit 1828 divides the binary image from which noise is removed into predetermined block units, and detects a block with a greatest number of image pixels.

The limited rectangle deriving unit 1830 measures maximum and minimum location values of the binary image in the upper, lower, left, and right directions from the center of the detected block to the outside thereof or from the outside of the detected block to the center thereof, and derives a limited rectangle having four vertexes of the measured maximum and minimum values. The image extracting unit 1832 derives a mixed code image region in the limited rectangle, and extracts the mixed code image from the original image based on the derived mixed code image region.

When the mixed code image is extracted using each element of the mixed code extracting unit 1820, the code image separating unit 1840 analyzes the color, shade, and brightness of each pixel of the mixed code image, divides the analyzed colors, shades, and brightnesses into groups, using a predetermined threshold, and divides the mixed code image into a first code image and a second code image according to the grouped colors, shades, and brightnesses.

The information extracting unit 1860 decodes the first and second code images to obtain first and second information, respectively. The information extracting unit 1860 includes a first decoder 1862, a second decoder 1864, an error controller 1866, and an information producing unit 1868.

One or both of the first and second code image include a data region(s) storing the first and/or second information, a control information region that includes construction information and interpretation information, a code direction information region, and an error control information region. A case where only the first code image includes the control information region will now be described for convenience.

The first decoder 1862 decodes the code direction information region of the first code image to obtain code direction information, and decodes the data region, the control information region, and the error control information region according to the code direction information to obtain the first information, control information, and error control information.

The second decoder 1864 obtains the second information by decoding the second code image based on the construction information included in the control information obtained by the first decoder 1862.

The error controller 1866 detects and corrects an error in the first and second information based on the error control information obtained by the first decoder 1862. The information producing unit 1868 produces information to be expressed using the mixed code by processing the first and second information based on the interpretation information (which specifies the relationship between the first and second information, and the formats and arrangement of the first and second information) the control information obtained by the first decoder 1862.

The present invention can be embodied as a computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network and the present invention may be sorted and implemented as a computer readable code in the distributed system.

The mixed code according to the present invention may include visual information indicating the purpose of the mixed code, a field to which the mixed code is applicable, and a way of using the same, thereby enabling a user to easily recognize it. For instance, it is possible to manufacture a cell or a pattern of an image code to include a company name or a uniform resource locator (URL), using a mixed code that is a combination of an image code and characters. Also, it is possible to manufacture an image code or each cell of the image code to include information regarding a logo, a symbol or a sign, using a mixed code that is a combination of an image code. Further, it is possible to manufacture a complex mixed code that is a combination of an image code, a character, and a logo.

In addition, additional information can be provided by adding an additional information image to the original image code. That is, it is possible to increase the amount of data to be contained in the mixed code by changing or adding additional information to the code.

The mixed code includes information specifying a code region, code direction, and reference points regarding an additional information image, thereby easily searching for the additional information image. That is, when a range of recognition is limited to the code region, it is possible to obtain additional information regarding the shape of the code region, e.g., the orientation and characteristic points thereof.

An error control information region of the mixed code is used to check and correct an error in basic code information. The basic code image and the additional information image are constructed to be decoded using a key value and an encryption method, thereby detecting whether a user is an authorized user who owns a right for a service.

Also, it is possible to make the additional information image be a photograph image so that it can be used in a security service. In addition, the mixed code according to the present invention is applicable to various fields of services such as inventory control.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of decoding a mixed code made by overlapping a first code image with a second code image, comprising:
   (a) receiving the original image which includes the mixed code;
   (b) obtaining a mixed code image by removing noise from the original image;
   (c) dividing colors, shades, and brightnesses of pixels of the mixed code image into groups using a predetermined threshold, and dividing the mixed code image into the first and second code images based on the groups, wherein the first code image includes construction information regarding the second image; and
   (d) decoding the first and second code images to extract first and second information, respectively,
   wherein (b) comprises:
   (b1) correcting distortion of the color and shade of the original image, which is caused by physical ambient conditions;
   (b2) producing a binary image by dividing one of the corrected color and shade into two colors based on a predetermined reference value; and
   (b3) obtaining the mixed code image by removing noise from the original image based on the binary image, and
   wherein (b3) comprises:
   (b3-1) determining a region contacting an edge of the binary image as noise and removing the region;
   (b3-2) dividing the binary image from which noise is removed into predetermined block units and detecting a block with a greatest number of pixels from the divided blocks;
   (b3-3) measuring maximum and minimum location values of the binary image in upper, lower, left, and right directions from a center of the detected block to an outside of the detected block or from the outside to the center;
   (b3-4) deriving a limited rectangle having vertexes of the measured maximum and minimum location values;
   (b3-5) extracting a mixed code image region in the limited rectangle; and
   (b3-6) deriving the mixed code image from the original image based on the extracted mixed code image region.

2. The method of claim 1, wherein (c) comprises:
   (c1) analyzing colors, shades, and brightnesses of pixels of the mixed code image;
   (c2) categorizing the analyzed colors, shades, and brightnesses into groups based on a predetermined threshold; and
   (c3) dividing the mixed code image into the first and second code images based on the grouped colors, shades, and brightnesses.

3. A method of decoding a mixed code made by overlapping a first code image with a second code image, comprising:
   (a) extracting the first and second code images from the mixed code according to the difference in color and brightness between the first and second code images, such that the first and second code images are separated from each other;

(b) obtaining construction information for each of the first and second code images by decoding a data region and a control information region of the first code image, wherein the first code image includes construction information regarding the second image; and (c) obtaining second information by decoding the second code image according to the construction information, wherein (b) comprises:

(b1) obtaining code direction information regarding the first and second code images by decoding a code direction information region of the first code image; and (b2) obtaining construction information regarding the second code image by decoding the control information region of the first code image based on the code direction information, and (c) comprises obtaining second information by decoding the second code image based on the code direction information and the construction information.

4. The method of claim 3, wherein the construction information comprises at least one of:

information regarding a total number of sub regions obtained by dividing the first code image into equal parts;

information regarding a total number of element images constituting the second code image;

information regarding positions of the centers of the element images in the sub-regions;

information regarding code types of the element images;

information regarding a method of encrypting each element image; and information regarding arrangement of the element images.

5. The method of claim 3, wherein (a) comprises dividing the mixed code image into the first and second code images by categorizing colors, shades, and brightnesses of pixels of the mixed code image into groups based on a predetermined threshold.

6. The method of claim 3, further comprising:

(d) obtaining error control information by decoding an error control information region of each of the first and second code images; and (e) detecting and correcting an error in the first and second information based on the error control information.

7. The method of claim 3, further comprising:

(f) obtaining a relationship between the first information of the first code image and the second information of the second code image by decoding the control information region of the first code image; and (g) obtaining information, which is to be expressed using the mixed code image, by applying the relationship to the first and second information.

8. An apparatus for decoding a mixed code, comprising:

an input unit receiving the original image having a mixed code image made by overlapping a first code image with a second code image;

a mixed code extracting unit obtaining the mixed code image by removing noise from the original image;

a code image separating unit dividing the mixed code image into the first and second code images by categorizing colors, shades, and brightnesses of pixels of the mixed code image into groups based on a predetermined threshold, wherein the first code image includes construction information regarding the second image; and an information extracting unit extracting first information and second information by decoding the first and second code images, respectively, wherein the mixed code extracting unit comprises:

a color distortion correcting unit correcting distortion of color and shade of the original image caused by physical ambient conditions under which the original image is received;

a binary image generating unit producing a binary image by dividing one of the corrected color and shade of the original image into two colors based on a predetermined reference value;

a noise removing unit determining and removing a region contacting an edge of the binary image;

a blocking unit dividing the binary image from which noise is removed into predetermined block units and detecting a block with a greatest number of pixels from the divided blocks;

a limited rectangle deriving unit measuring maximum and minimum location values of the binary image in upper, lower, left, and right directions from the center of the detected block to an outside of the detected block or from the outside to the center, and deriving a limited rectangle having vertexes of the measured maximum and minimum location values; and an image extracting unit deriving a mixed code image region in the limited rectangle and obtaining the mixed code image from the original image based on the derived mixed code image region.

9. The apparatus of claim 8, wherein the code image separating unit analyzes colors, shades, and brightnesses of pixels of the mixed code image, categorizing the colors, shades, and brightnesses into groups based on a predetermined threshold, and dividing the mixed code image into the first and second code images based on the grouped colors, shades, and brightnesses.

10. The apparatus of claim 8, wherein the information extracting unit comprises:

a first decoder decoding a data region and a control information region of the first code image to obtain construction information regarding each of the first and second information; and a second decoder obtaining second information by decoding the second code image based on the construction information.

11. The apparatus of claim 10, wherein the construction information comprises at least one of:

information regarding a total number of sub regions obtained by dividing the first code image into equal parts;

information regarding a total number of element images constituting the second code image;

information regarding positions of the centers of the element images in the sub- regions;

information regarding code types of the element images;

information regarding a method of encrypting each element image; and information regarding arrangement of the element images.

12. The apparatus of claim 10, wherein the first decoder obtains error control information by decoding an error control information region of each of the first and second code images, the apparatus further comprising an error controller detecting and correcting an error in the first and second information based on the error control information.

13. The apparatus of claim 10, wherein the first decoder obtains information regarding a relationship between the first information of the first code image and the second information of the second code image by decoding the control information region of the first code image, and the second decoder obtaining information, which is to be expressed using the mixed code, by applying the relationship to the first and second information.

14. An apparatus for decoding a mixed code, comprising:

an input unit receiving the original image having a mixed code image made by overlapping a first code image with a second code image;

a mixed code extracting unit obtaining the mixed code image by removing noise from the original image;

a code image separating unit dividing the mixed code image into the first and second code images by categorizing colors, shades, and brightnesses of pixels of the mixed code image into groups based on a predetermined threshold;

an information extracting unit extracting first information and second information by decoding the first and second code images, respectively;

wherein the information extracting unit comprises:

a first decoder decoding a data region and a control information region of the first code image to obtain construction information regarding each of the first and second information; and a second decoder obtaining second information by decoding the second code image based on the construction information, wherein the first decoder obtains code direction information regarding the first and second code images by decoding a code direction information region of the first code image, and construction information regarding the second code image by decoding the control information region of the first code image based on the code direction information, and the second decoder obtains second information by decoding the second code image based on the code direction information and the construction information.

* * * * *